United States Patent [19]

Fujimoto et al.

[11] Patent Number: 5,563,397
[45] Date of Patent: Oct. 8, 1996

[54] CARDS RECEIVING MECHANISM HAVING FUNCTION FOR CERTAINLY RECEIVING QUALIFIED CARDS AND BLOCKING UNQUALIFIED CARDS AND FOREIGN ARTICLES

[75] Inventors: Osamu Fujimoto, Machida; Yutaka Yoshino, Odawara, both of Japan

[73] Assignee: Anritsu Corporation, Tokyo, Japan

[21] Appl. No.: 529,540

[22] Filed: Sep. 18, 1995

Related U.S. Application Data

[63] Continuation-in-part of Ser. No. 310,661, Sep. 22, 1994, abandoned.

[30] Foreign Application Priority Data

Dec. 16, 1993 [JP] Japan .................................. 5-343570
Jun. 26, 1995 [JP] Japan .................................. 7-183506

[51] Int. Cl.⁶ .................................................. G06K 7/06
[52] U.S. Cl. .......................... 235/441; 235/479; 235/486
[58] Field of Search ................................. 235/441, 479, 235/486

[56] References Cited

U.S. PATENT DOCUMENTS 4,873,425 10/1989 Langlais et al. .
5,012,078 4/1991 Pernet .
5,202,551 4/1993 Parrer et al. .
5,370,544 12/1994 Reichardt ............................. 235/441

FOREIGN PATENT DOCUMENTS 53-48649 11/1978 Japan .
62-85947 6/1987 Japan .
63-89172 6/1988 Japan .
2-11591 1/1990 Japan .

*Primary Examiner*—Harold Pitts
*Attorney, Agent, or Firm*—Frishauf, Holtz, Goodman, Langer & Chick

[57] ABSTRACT

A card C having a predetermined thickness is guided by guide grooves formed in corresponding projecting portions of a card slot to enter. When the leading end of the card C is brought into contact with the lower edges of contact portions of a shutter member, the shutter member is pivoted about the front end sides of arm portions. A shutter plate arranged on the rear end side of the shutter member is moved upward to allow the card C having the predetermined thickness to pass deep. If a card C' having a thickness smaller than the predetermined thickness enters, a regulation portion projecting from the lower portion of the shutter plate of the shutter member is located lower than the bottom surface of a card passage. The leading end of the card C' having the smaller thickness is brought into contact with the regulation portion to prevent the card C' from entering deep. Even if the thin card C' is forcibly inserted, downward movement of the leading end of the card C' is regulated by the regulation portion, thereby preventing passage of the card C' and a card jam.

10 Claims, 18 Drawing Sheets

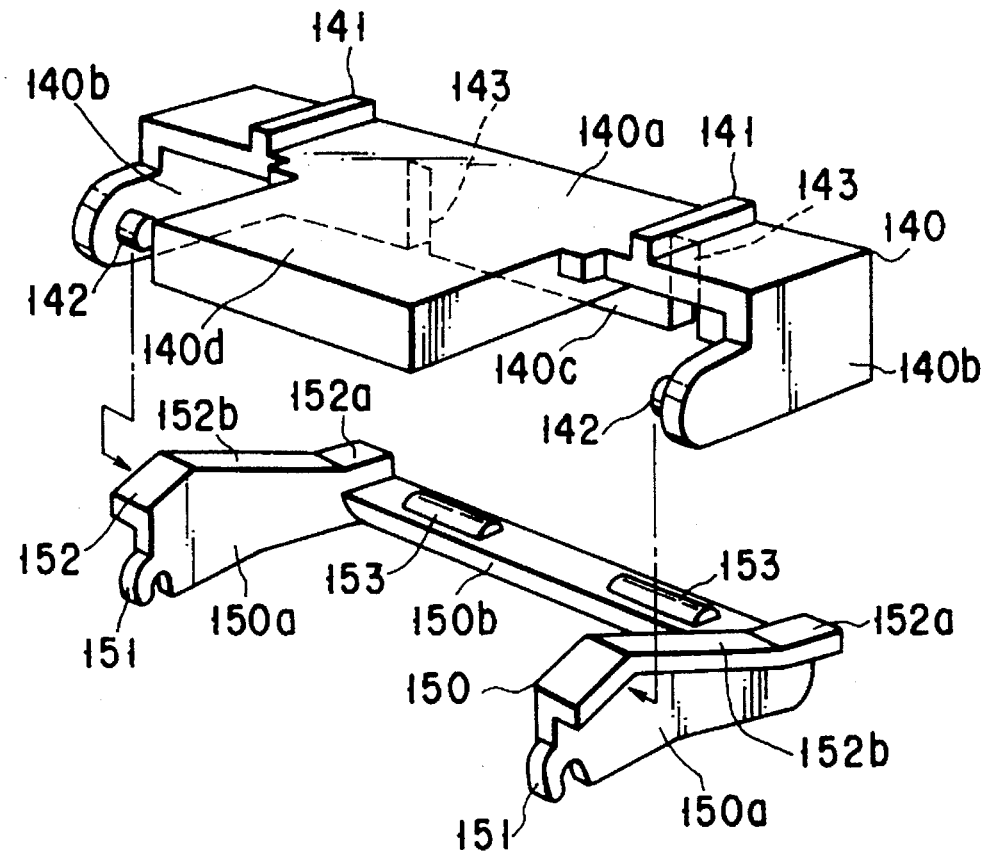
FIG. 15
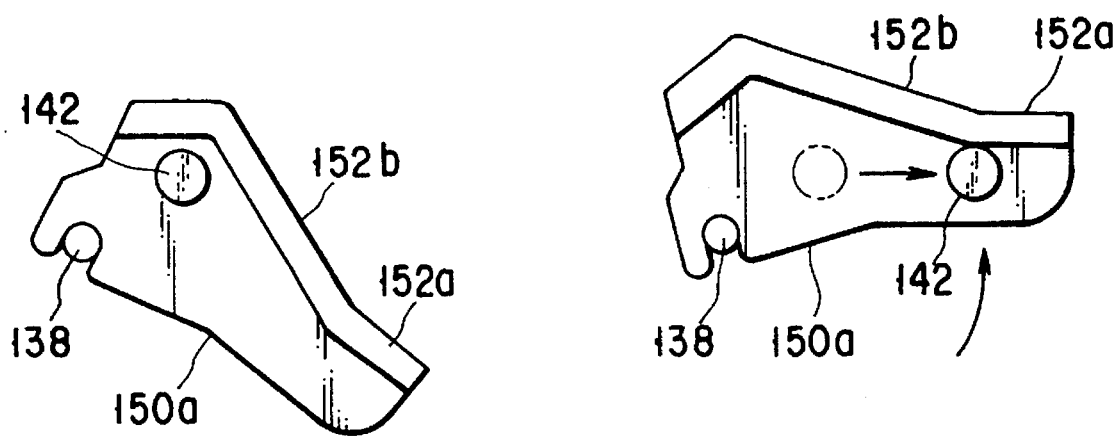
FIG. 16A
FIG. 16B

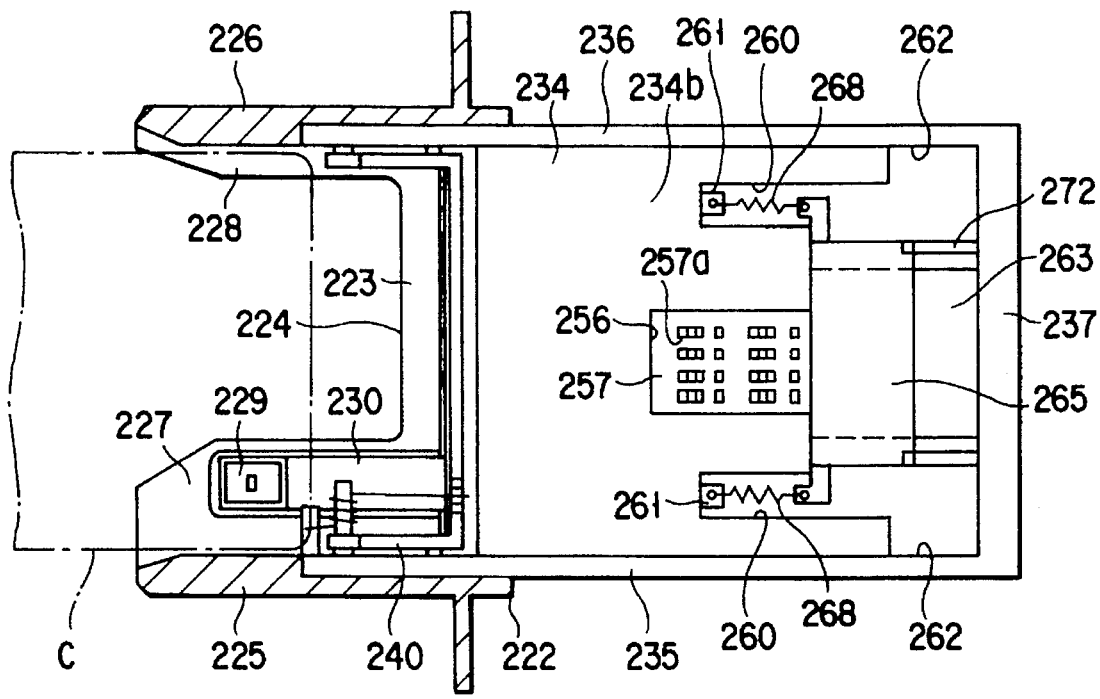
F I G. 26
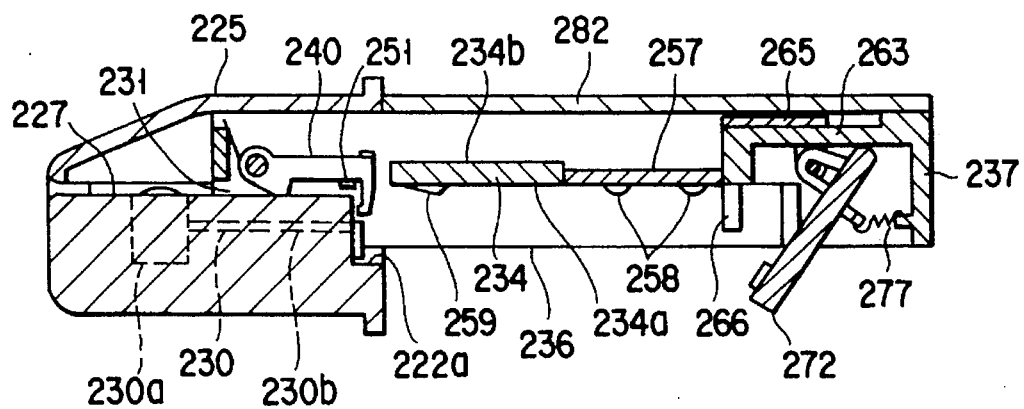
F I G. 27

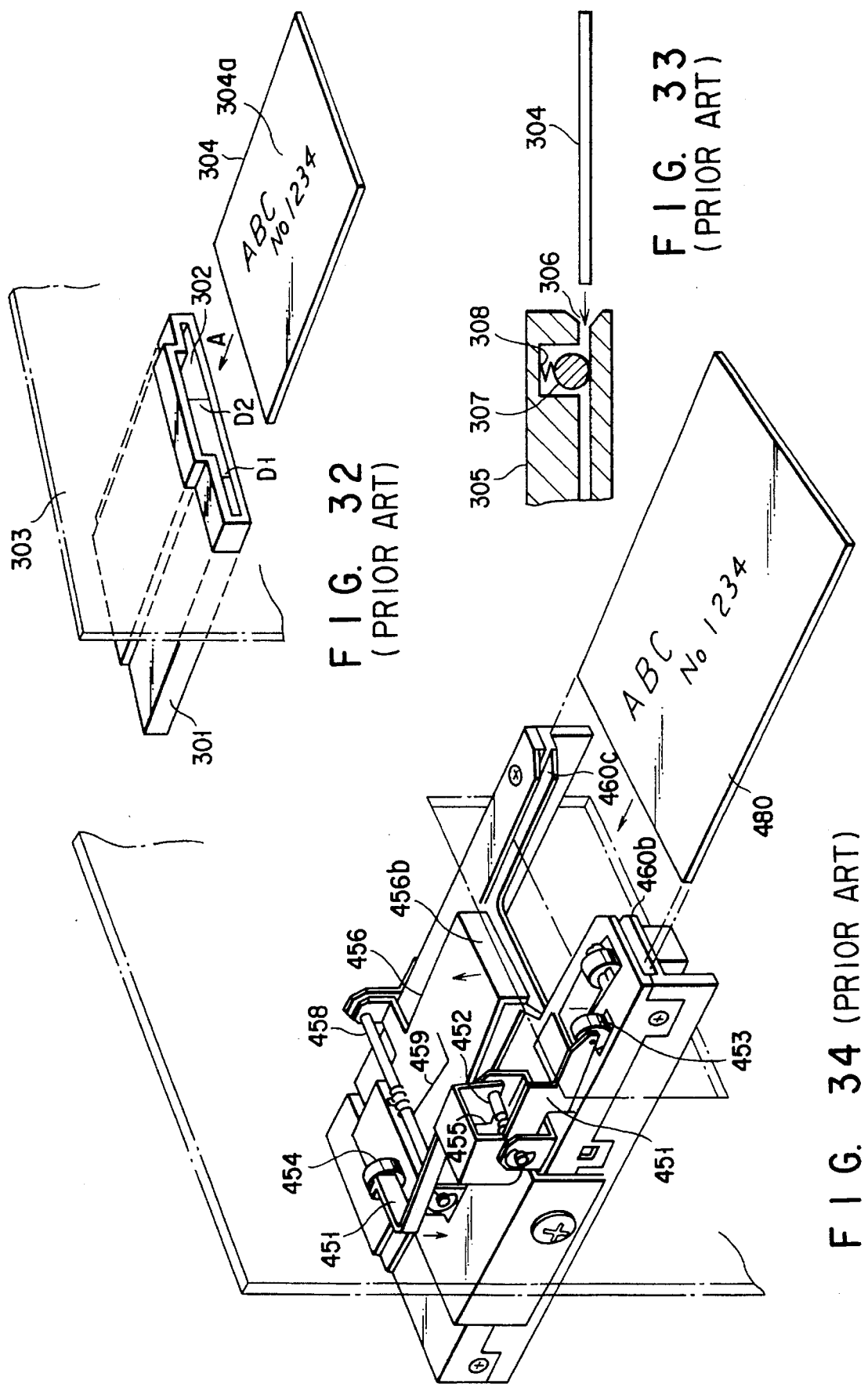

CARDS RECEIVING MECHANISM HAVING FUNCTION FOR CERTAINLY RECEIVING QUALIFIED CARDS AND BLOCKING UNQUALIFIED CARDS AND FOREIGN ARTICLES

CROSS-REFERENCE TO THE RELATED APPLICATIONS

This application is a continuation-in-part of U.S. patent application Ser. No. 08/310,661, filed Sep. 22, 1994 now abandoned.

BACKGROUND OF THE INVENTION

1. Field of the Invention

The present invention generally relates to a card processing apparatus and, more particularly, a card receiving mechanism for receiving only a qualified card having a regular width and thickness and preventing an unqualified card having no regular width or thickness and a foreign article such as a coin from entering.

Cards in the present invention include all cards such as magnetic cards, optical cards, IC cards, and various prepaid cards, which are issued for various transactions and various application purposes.

2. Description of the Related Art

Card reading apparatuses are used for reading various information (magnetic information, optical information, and electrical information) recorded on various cards described above to use various equipments and pay the expenses incurred by use of these equipments in accordance with the read information.

FIG. 32 is a schematic perspective view showing a card receiving portion of a card reading apparatus 301 arranged in an equipment such as a public telephone set. This card reading apparatus 301 is attached such that a card insertion port 302 formed in a recessed shape projects from an operation surface 303 of the equipment.

A gap D1 on each side of the recessed card insertion port 302 is set slightly larger than the thickness of a card to be inserted. A gap D2 at the central portion has a size for allowing to pass an embossed projecting display portion (ABC, N01234) of an upper surface side 304a of a card 304.

When the card 304 is inserted in a direction indicated by an arrow A, the card 304 is stored in a card storage portion (not shown) of the card reading apparatus 301 through the card insertion port 302. The information of the card 304 is read in an inserting/removing operation of the card 304, thereby enabling use of the equipment.

Of equipments using cards, in a public equipment such as a public telephone set, users may erroneously or intentionally insert foreign articles such as a coin from a card insertion port because the users are not unspecified.

Especially when the gap at the central portion of the card insertion port 302 is set large, a foreign article such as a coin is easily inserted from this port. A card cannot be inserted due to the inserted foreign article, or the card reading apparatus or the inserted card itself may be damaged.

For this reason, a mechanism such as a reading apparatus 305 shown in FIG. 33 is used as an automatic reading apparatus. In this reading apparatus 305, a roller 307 having a length almost equal to the width of a card insertion port 306 is attached by the biasing force of a spring 308 so as to close a space slightly inside of the card insertion port. The roller 307 is moved upward by the insertion force of the card 304 to receive a card. This mechanism effectively prevents dirt, dust, a piece of paper, and the like from entering. This mechanism, however, cannot prevent a solid foreign article such as a coin from entering.

Jpn. UM Appln. KOKAI Publication No. 63-89172 discloses the following technique. That is, when a sensor detects that an IC card is inserted from a card insertion port, the IC card is received inside by a driving motor. At the same time, a shutter plate is moved in the card insertion port by the motor force to prevent the next card from being inserted during the card receiving operation.

As is apparent from that purpose, the shutter of this conventional technique acts to close the card insertion port only when an IC card has already been received. If no IC card is inserted, the shutter is always open. This technique, therefore, cannot prevent not only dirt and dust but also a foreign article such as a coin from being inserted.

In a structure wherein a sensor for detecting insertion of a card is arranged deep, as this conventional technique, a shutter cannot act in accordance with whether an inserted article is guided by a guide portion and inserted, unlike a prior application (to be described later).

Jpn. UM Appln. No. 60-177910 (corresponding to Japanese KOKAI Publication No. 62-85947) discloses a card information reading apparatus. In this card information reading apparatus, two swingable plates stand on both the sides of a guide path for guiding a card to be inserted from a card insertion port such that the swingable plates interpose the guide path to oppose each other. Projections formed on the respective swingable plates are inserted laterally into the guide path. Both the projections are brought into contact with the widthwise edges of a card entering the guide path. Both the swingable plates are pivoted about a shaft along a card insertion direction to release pivotal regulation of a shutter arranged behind the swingable plates. The card passing through the projections presses and opens the shutter to enter deep. That is, this conventional technique has a structure in which, when a card enters, the projections of the respective swingable plates are moved in the widthwise direction of inserted card and pivoted about the shaft along the card insertion direction. This conventional art, however, can prevent only a narrow foreign article from entering, but cannot prevent foreign articles having different thicknesses from entering.

In this conventional technique, when a card is inserted deep, the projections and the shutter plate are brought into contact with the card to tend to damage it. Further, in this conventional technique, the leading end of a card presses and opens the shutter plate. With this structure, as the card is pressed deeper, the tension of a spring which biases the shutter plate in a direction to close it becomes stronger. Therefore, a strong insertion force must be applied against this tension.

For this reason, the same assignee as in the present invention filed a card receiving mechanism disclosed in Jpn. UM Appln. KOKAI Publication No. 2-11591, which is expected to solve the above problems of the conventional techniques.

More specifically, as shown in FIG. 34, this prior application comprises:

a pair of guide portions (460b, 460c), arranged opposite to each other, for guiding a card (480) to a card insertion port while regulating movement of the card (480) in the widthwise direction perpendicular to the insertion direction;

a shutter plate having a middle portion supported behind the card insertion port so as to allow the pair of guide portions to extend in a direction to guide the card and so as to pivot the pair of guide portions about a first shaft (458) along the card widthwise direction, and having, on a front end side, a shield portion (456b) for shielding at least part of the card insertion port to prevent the card from entering the card insertion port;

a first biasing means (459) for biasing the shutter plate in a direction to shield at least part of the card insertion port by the shield portion;

a transfer lever (451) having a middle portion supported so as to allow the pair of guide portions to extend in the direction of guiding the card and so as to pivot the pair of guide portions about a second shaft (452) along the card widthwise direction, having, on a front end side, a contact portion (453) which is brought into contact with the card at a position before the shield portion of the shutter plate near one of the guide portions to move in a direction of card thickness, and having a press portion (454) for pressing the rear portion of the shutter plate in the direction of card thickness to pivot the shutter plate in a direction to retract the shield portion from a position of shielding at least part of the card insertion port when the contact portion is moved by a predetermined distance or more in the direction of card thickness; and a second biasing means (455) for biasing the transfer lever in a direction to bring the contact portion into contact with the card.

According to the prior application having such an arrangement, when a card which is guided by the guide portions to be brought into contact with the contact portion is inserted, the contact portion is moved by its insertion force. With this movement, the shutter is actuated, and the shield portion which shields at least part of the card insertion port is opened to receive the card deep. Even if a foreign article such as a coin which is not guided by the guide portions is forcibly inserted, the contact portion is not moved, and the shutter is not actuated to keep the shield portion closed. Therefore, not only dirt and dust but also a foreign article can be certainly prevented from entering the card insertion port.

More specifically, this prior application has an structure in which, when a card enters, the contact portion near the guide portions is brought into contact with the card and moved in the direction of thickness, and the transfer lever is pivoted about the shaft along the widthwise direction of the card to be inserted.

That is, according to this prior application, the contact portion of the transfer lever is arranged near one guide portion to prevent a narrow foreign article from being inserted. The transfer lever is pivoted through an angle corresponding to the thickness of a card passing through the guide portions to retractably move the shield portion of the shutter plate, thereby preventing a foreign article having no proper thickness from being inserted.

Further, according to this prior application, when the leading end of the card passes through the contact portion of the transfer lever, the shutter plate whose rear portion is pressed by the transfer lever is pivoted to retract the shield portion arranged on the front end side of the shutter plate from a position of shielding the card insertion port, thereby allowing the card to pass deep. To the contrary, according to this above-mentioned reference, when the leading end of the card passes through the projections, only the pivotal regulation of the shutter plate is released, and the shutter plate is not retracted from the card passage. The shutter plate is pressed by the leading end of the card and pivoted to be retracted from the card passage.

More specifically, in this prior application, when a card is to be inserted deep, only the contact portion of the transfer lever is brought into contact with the card. For this reason, the card is hardly damaged.

Also in this prior application, after the leading end of the card passes through the contact portion of the transfer lever, the force of this mechanism to be applied to the card becomes constant regardless of the card position. The card can be inserted deep without applying a strong insertion force.

Note that the same assignee of the present invention filed a divisional application having the following arrangement as the subject based on the above prior application in Japan on Jul. 3, 1995.

The subject of this divisional application in Japan is a card receiving mechanism comprising:

a pair of guide portions (460b, 460c), arranged opposite to each other, for guiding a card while regulating movement of the card in the widthwise direction perpendicular to a card insertion direction;

a contact portion (453) which is arranged near at least one of the guide portions around the card insertion port and brought into contact with the inserted and guided card, and receives a force in a direction of card thickness upon card insertion to be moved in the direction of card thickness; and a shield portion (456) arranged to locate a portion contiguous to the contact portion and shielding at least part of the card insertion port behind a contact point between the contact portion and the card, and actuated to open the shield portion with movement of the contact portion upon the card insertion.

The card receiving mechanism of the prior application or the divisional application described above, however, requires a large number of components because the contact portion and the shield portion are formed as different units. For this reason, the arrangement is slightly complicated, and the whole card reading (processing) apparatus tends to be increased in cost.

A reduction in cost of the mechanism of this type becomes an important subject because this mechanism is applied to various equipment such as a public telephone set.

On the other hand, a card processing apparatus is used for reading various information recorded on cards to use various equipments and pay the expenses incurred by use of these equipments in accordance with the read information.

The card processing apparatus is constituted to receive a card from a card insertion port formed in a slit shape, thereby reading/writing information. Cards to be processed by the card processing apparatus include a thin card such as a prepaid card, and a thick card such as an IC card.

The widths of these cards are almost equal. For this reason, a user may erroneously insert a thin card into a processing apparatus for a thick card only, and to the contrary a thick card into a processing apparatus for a thin card only.

Of these insertion errors, the insertion error of a thick card into the card processing apparatus for a thin card only can be relatively easily prevented by setting a gap of a card insertion port in the direction of height (direction of card thickness) small. However, the insertion error of a thin card into the card processing apparatus for a thick card only cannot be prevented by changing the size of a card insertion port.

As a technique for preventing a thin card from being erroneously inserted, Jpn. UM Appln. KOKOKU Publication No. 53-48649 discloses a card receiving mechanism, as shown in FIG. 35A.

In this mechanism, a detection roller 504 supported by one end side of a detection lever 503 is inserted in a card passage 502 communicating with a card insertion port 501. A card entering the card passage 502 is allowed to pass through the detection roller 504, while the card is brought into contact with the circumferential surface of the detection roller 504. With this movement, the detection lever 503 is pivoted about a shaft 505 through an angle corresponding to the card thickness to move a shutter 506 coupled to the other end side of the detection lever 503 downward against the biasing force of a spring 507.

A slit 508 is continuously formed in the lower portion of the shutter 506 in the widthwise direction of the card. As shown in FIG. 35B, when a thick card C such as a credit card passes through the detection roller 504, the shutter 506 is moved down to set the lower edge of the slit 508 slightly lower than the bottom surface of the card passage 502. The inserted thick card C is allowed to pass deep.

As shown in FIG. 35C, when a thin card C' passes through the detection roller 504, the shutter 506 is moved down to a position where the lower edge of the slit 508 is higher than the bottom surface of the card passage 502. For this reason, the leading end of the thin card C' is brought into contact with the front surface of the shutter 506, and the thin card C' is prevented from entering deep.

As described above, in the mechanism wherein a pivotal force generated upon passage of an inserted card is converted into a linear motion to transfer it to the shutter, at least a card passage detection member and a card entrance prevention member must be formed as different members, resulting in an increase in number of components.

In the conventional mechanism, described above, wherein the moving direction of the detection roller 504 is reverse to the moving direction of the shutter 506 upon entrance of a card, if the thin card C' is forcibly inserted, the entire card may be bent upward, as shown in FIG. 35D. The detection roller 504 is pressed upward by this bent portion to move the shutter 506 down. For this reason, the leading end of the card C' may pass through the slit 508, or the leading end of the card C' may be caught in a shutter passage together with the shutter 506 not to be removed.

In a card processing apparatus having the above mechanism, the detection roller and its shaft must be arranged between the card insertion port and the shutter. Further, if the shutter is to be moved by a distance larger than the thickness of a card to pass through the detection roller, the length of the detection lever must be increased. Therefore, the distance from the card insertion port to the shutter is undesirably increased. A short foreign article other than a card is jammed between the card insertion port and the shutter to disable the card processing apparatus due to this card jam.

SUMMARY OF THE INVENTION

It is, therefore, an object of the present invention to provide a new and improved card receiving mechanism in which only a qualified card having a regular width and thickness can be certainly received with a smaller number of components, and an unqualified card having no regular width or thickness and a foreign article such as a coin can be prevented from entering.

It is another object of the present invention to provide a card receiving mechanism and a card processing apparatus which can certainly prevent a thin card and a short foreign article other than the card from entering with a smaller number of components.

According to an aspect of the present invention, there is provided a card receiving mechanism comprising:

a card slot member having a card insertion port, and a pair of guide grooves, arranged opposite to each other, for guiding a card inserted from the card insertion port while regulating movement of the card in a widthwise direction perpendicular to a card insertion direction;

a shutter member having a lever portion arranged near at least one of the pair of guide grooves around the card insertion port and brought into contact with the card inserted and guided to be moved in a direction of card thickness, and a shutter portion which is integrally formed by the lever portion, located behind a contact point with the lever portion so as to shield at least part of the card insertion port, and actuated to open a shielded portion of the card insertion port with movement of the lever portion in the direction of card thickness upon insertion of the card; and a biasing member for applying a biasing force in a direction to always shield at least part of the card insertion port by the shutter portion of the shutter member.

According to another aspect of the present invention, there is provided a card receiving mechanism comprising: a pair of opposing guide portions, extending in a card insertion direction, for receiving an inserted card from a card passage while regulating widthwise movement of the card; and a shutter member, arranged near at least one of the pair of guide portions, for allowing or preventing passage of the card guided by the pair of guide portions to enter in accordance with a thickness of the card, the shutter member being integrally formed by an arm portion extending along a guide surface of at least one of the guide portions and supported to be pivotable about a front end portion on a port side of the card passage, a shutter portion extending from a rear end portion of the arm portion with one surface facing the port side of the card passage so as to shield the card passage, a regulation portion, arranged on the one surface of the shutter portion, for regulating movement of a leading end of the card in contact with the one surface in a direction of card thickness, and a contact portion extending from a middle portion of the arm portion toward the card passage, brought into contact with the leading end of the card entering the card passage to pivot the arm portion through an angle corresponding to the thickness of the card, and biased to enter the card passage, wherein, when a card having a thickness smaller than a predetermined thickness is guided by the pair of guide portions to pass through the contact portion, the one surface of the shutter member is brought into contact with the leading end of the card to prevent the card having the smaller thickness from entering, and, when a card having the predetermined thickness is guided by the pair of guide portions to pass through the contact portion, the shutter member is retracted from the card passage in accordance with the thickness of the card.

According to still another aspect of the present invention, there is provided a card processing apparatus comprising: a card slot having a base portion which has a slit-like card insertion port on a front surface side, a projecting portion projecting forward from the front end side of the base portion, and a guide groove, arranged on a side surface of the projecting portion so as to communicate with the card insertion port, for guiding a card to the card insertion port while regulating widthwise movement of the card; a shutter member for allowing or preventing passage of the card inserted from the card insertion port in accordance with a thickness of the card; a frame for receiving the card which passes through the shutter member to enter up to a predetermined position with a trailing end of the card being exposed from a front surface of the card slot while regulating the widthwise movement of the card; and reading/writing means for reading/writing information from/in the card received to the predetermined position of the frame, the shutter member being integrally formed by an arm portion extending along a side wall surface of the guide groove in the projecting portion of the card slot and supported to be pivotable about a front end portion along the side wall surface, a shutter portion extending from a rear end portion of the arm portion with one surface facing the card insertion port so as to shield a card passage behind the card insertion port, a regulation portion, arranged on the one surface of the shutter portion, for regulating movement of a leading end of the card in contact with the one surface in a direction of thickness, and a contact portion extending from a middle portion of the arm portion toward the guide groove, brought into contact with the leading end of the card passing through the guide groove to pivot the arm portion through an angle corresponding to the thickness of the card, and biased to enter the guide groove, wherein, when a card having a thickness smaller than a predetermined thickness passes through the guide groove, the one surface of the shutter member is brought into contact with the leading end of the card to prevent the card having the smaller thickness from entering the frame, and, when a card having the predetermined thickness passes through the guide groove, the shutter member is retracted from the card passage in accordance with the thickness of the card to allow the card to enter the frame.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 15 is an exploded perspective view showing the main part of the IC card processing apparatus of the second embodiment;

FIGS. 16A and 16B are schematic views for explaining the operation of a card pressing member with respect to the sliding operation of a slide member in the IC card processing apparatus of the second embodiment;

FIG. 26 is a partially cutaway plan view showing the card processing apparatus of the third embodiment from which a cover is removed;

FIG. 27 is a sectional view showing the card processing apparatus along a line 27—27 in FIG. 22;

FIG. 32 is a schematic perspective view showing a conventional card receiving mechanism;

FIG. 33 is a schematic side view showing another conventional card receiving mechanism;

FIG. 34 is a schematic view showing the arrangement of a card receiving mechanism of a prior application.

DETAILED DESCRIPTION OF THE PREFERRED EMBODIMENTS

Figure 1:
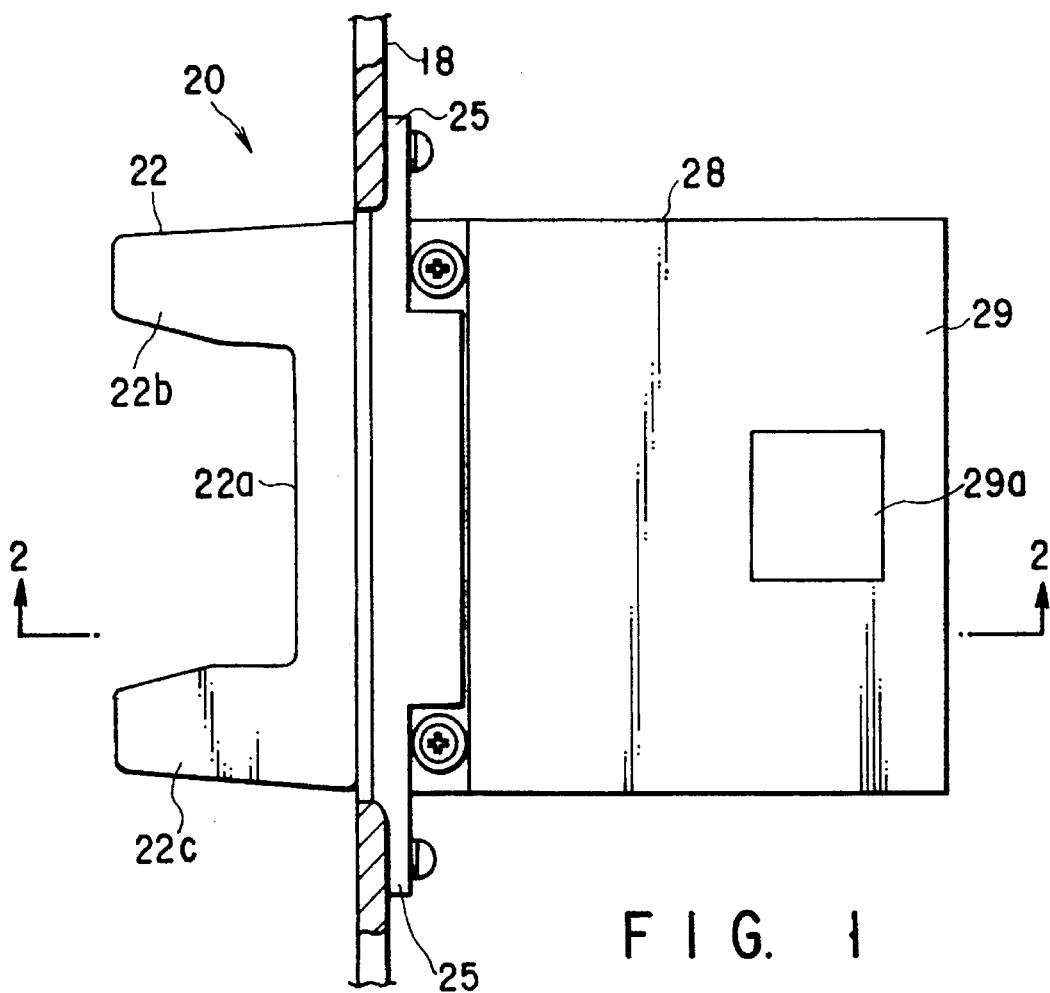
FIG. 1 is a plan view showing an IC card processing apparatus according to the first embodiment of the present invention.
Figure 2:
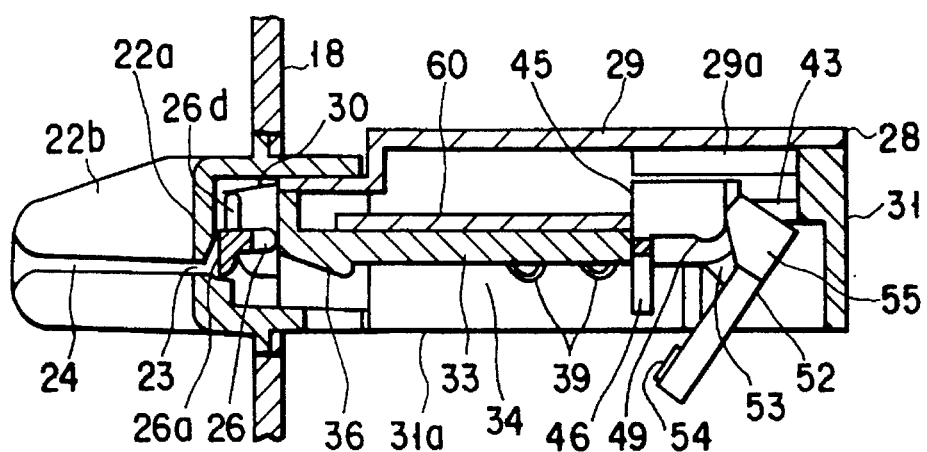
FIG. 2 is a sectional view showing the IC card processing apparatus along a line 2—2 in FIG. 1.
Figure 3:
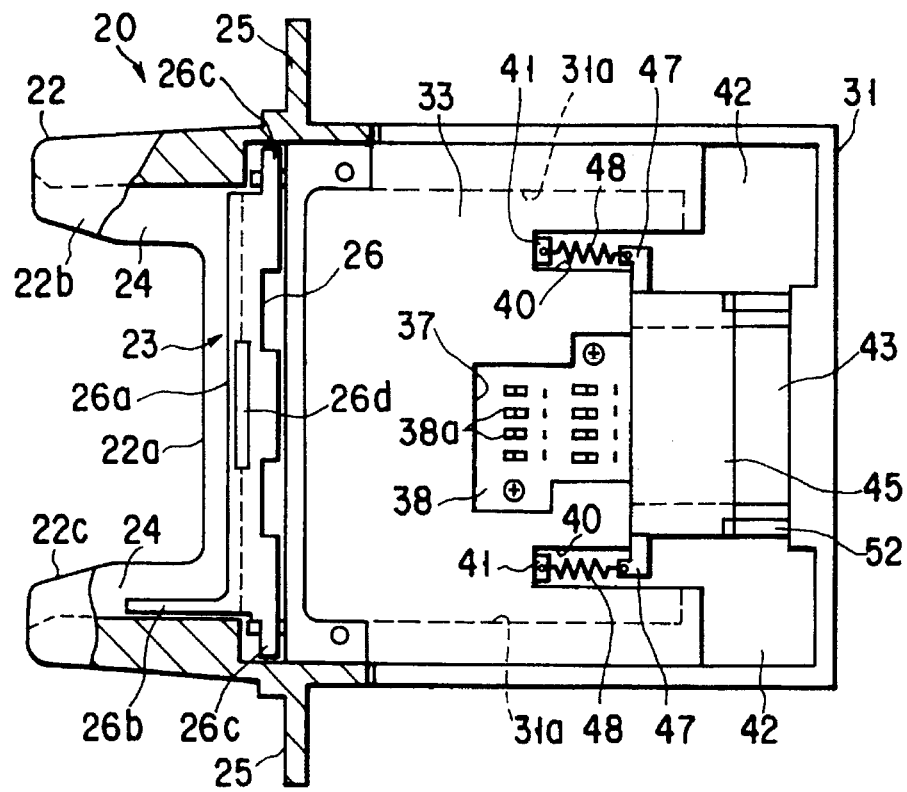
FIG. 3 is a plan view showing the IC card processing apparatus of the first embodiment in which a cover and a circuit board are not illustrated.
Figure 4:
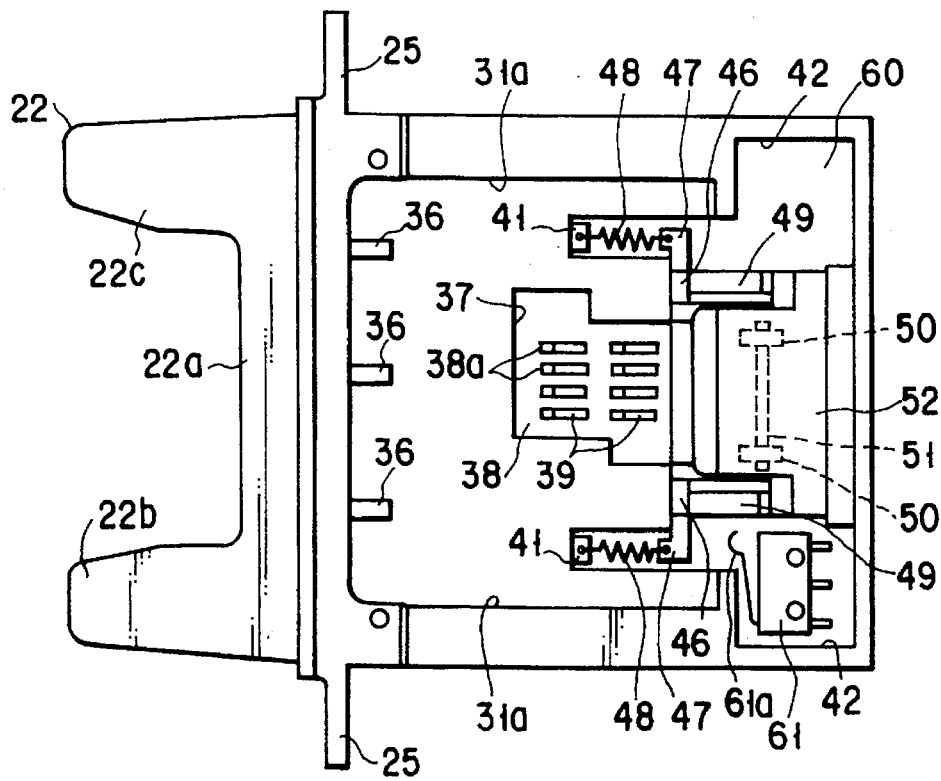
FIG. 4 is a bottom view showing the IC card processing apparatus of the first embodiment.

Reference will now be made in detail to the presently preferred embodiments of the invention as illustrated in the accompanying drawings, in which like reference characters designate like or corresponding parts throughout the several drawings.

The first embodiment of the present invention will be described below with reference to the accompanying drawings.

FIGS. 1 to 6 show an IC card processing apparatus 20 according to the first embodiment of the present invention. This IC card processing apparatus 20 is arranged in, e.g., a housing 18 of a public telephone set which can be used by a user with a prepaid IC card. An IC card 1 manually inserted by the user is received to a position where the IC card 1 can be removed after the public telephone set is used, and call rate information recorded on the IC card is updated.

The IC card processing apparatus 20 is constituted by a metal card slot 22 fixed to project from the housing 18 to receive the IC card 1 from the outside and a resin housing 28 fixed to the rear portion of the card slot 22.

The card slot 22 is constituted by a base portion 22a having a card insertion port 23 formed on the front surface side thereof and opposing projecting portions 22b and 22c projecting forward from both the sides of the base portion 22a. The card slot 22 is formed to have an almost U shape when viewed from the upper direction. The interval between the opposing surfaces of the two projecting portions 22b and 22c is set to be smaller than the width of the IC card. Guide grooves 24, communicating with the card insertion port 23, for horizontally guiding the IC card 1 inserted from the user side are arranged on the opposing surfaces of the projecting portions 22b and 22c, respectively.

Flanges 25 are arranged on both the sides of the card slot 22. Since the flanges 25 are mounted on the inner surface side of the housing 18 with screws or the like, the IC card processing apparatus 20 is entirely supported by the housing 18.

Figure 5:
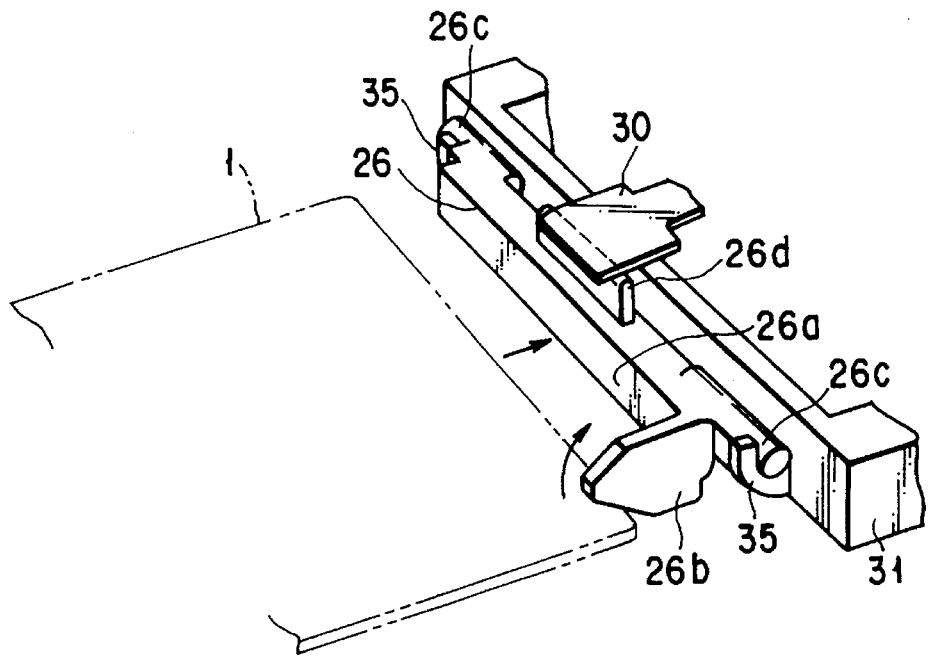
FIG. 5 is a perspective view showing the main part of the IC card processing apparatus of the first embodiment.

A shutter member 26 is arranged behind the card insertion port 23. The shutter member 26, as shown in FIG. 5, is integrally formed by a shutter plate 26a having a long side extending in the horizontal direction to close the card insertion port 23, a shutter lever 26b extending from one end of the shutter plate 26a toward the projecting portion 22c of the card slot 22 and having an inclined lower portion projecting toward the guide groove 24 of the projecting portion 22c, shafts 26c extending from both the ends of the shutter plate 26a in the side direction, and a projection 26d extending upward from the upper central end of the shutter plate 26a.

Note that the shafts 26c are pivotally supported by bearings 35 of a frame 31 (to be described later), the upper end of the projection 26d is in contact with the lower surface of a leaf spring 30 attached to a cover 29 (to be described later), and this leaf spring 30 biases the shutter member such that the shutter plate 26a and the shutter lever 26b face downward, i.e., a force for closing the card insertion port 23 acts on the shutter member.

In this shutter member 26, when the IC card 1 having a proper width is inserted to be supported between the guide grooves 24 of the card slot 22, the shutter lever 26b is pressed upward by a card passing through the guide groove 24 of the projecting portion 22b and pivoted upward using the shafts 26c on both the ends as fulcrums to retract the shutter plate 26a upward, thereby opening the card insertion port 23.

When a piece of paper or the like having a width smaller than that of the proper IC card 1 is to be directly inserted in the card insertion port 23, the shutter lever 26b is not pressed upward. For this reason, the card insertion port 23 is kept closed by the shutter plate 26a, and the piece of paper or the like can be prevented from being inserted from the card insertion port 23.

The housing 28 fixed on the rear portion of the card slot 22 is constituted by the cover 29 and the frame 31 whose upper surface is covered with the cover 29.

The cover 29 is fixed to have a stepped-down front portion brought into contact with the inner wall of the upper portion of the base portion 22a of the card slot 22. The leaf spring 30 for pressing the shutter member 26 downward is attached to the upper surface of the front end of the cover 29, and a regulating portion 29a formed to be depressed by one step is formed on the lower surface of the rear portion of the cover 29 to regulate upward movement of a slide member 45 (to be described later).

The frame 31 is formed to have an almost rectangular shape, and a middle plate 33 for vertically partitioning the interior of the frame is arranged at the middle stage portion of the frame 31. The frame 31 inserted from the card insertion port 23 is received into a card storage unit 34 surrounded by the lower surface of the middle plate 33 and inner walls 31a and 31a of the frame 31 extending vertically downward from both the sides of the middle plate 33.

The card storage unit 34 is formed to have the same width as that of the card insertion port 23, and the lower surface of the card storage unit 34 has a large opening in a range of the lower end of the rear portion of the card slot 22 to the rear end of the middle plate 33 to discharge a wrong card intentionally cut short, dust, or the like.

The bearings 35 for supporting the shafts 26c of the shutter member 26 extend from both the sides of the front end of the middle plate 33. In addition, three inclined portions 36 inclined downward toward the rear extend from the front end of the lower surface of the middle plate 33.

A terminal plate mounting hole 37 is formed to extend through the almost central portion of the middle plate 33. A terminal plate 38 is arranged in the terminal plate mounting hole 37 with screws or the like. Contact terminals 39 to be brought into contact with the external terminals of the an IC card, respectively, are arranged in a 2×4 matrix. Each of the contact terminals 39 consists of a conductive material (e.g., phosphor bronze or the like) having spring characteristics and is formed to be bent in a V shape. One end of each contact terminal 39 is fixed on the terminal plate 38, and the other end is inserted in a corresponding one of terminal holes 38 formed in the terminal plate 38, so that the contact terminals 39 are supported by the terminal plate 38. When the contact terminals 39 are pressed from the lower direction, the contact terminals 39 are moved upward while the contact terminals 39 are elastically deformed, and the elastic restoring force of the contact terminals 39 opposes the pressing force from the lower direction.

The inclined portions 36 guide a card inserted from the card insertion port 23 such that the leading end of the card is separated from the lower surface of the middle plate 33, and the contact terminals 39 projecting downward from the lower surface of the middle plate 33 are prevented from being deformed by the leading end of the card.

Spring grooves 40 are formed on both the sides of the terminal plate mounting hole 37, respectively, and spring hooks 41 are formed at the front ends of the spring grooves 40, respectively. The spring grooves 40 are formed to communicate with holes 42 vertically extending through both the ends of the rear portion of the frame.

On the rear portion side of the middle plate 33, a slide table 43 formed higher than the upper surface of the middle plate by one step extends to the rear portion of the frame to partition the holes 42.

Figure 6:
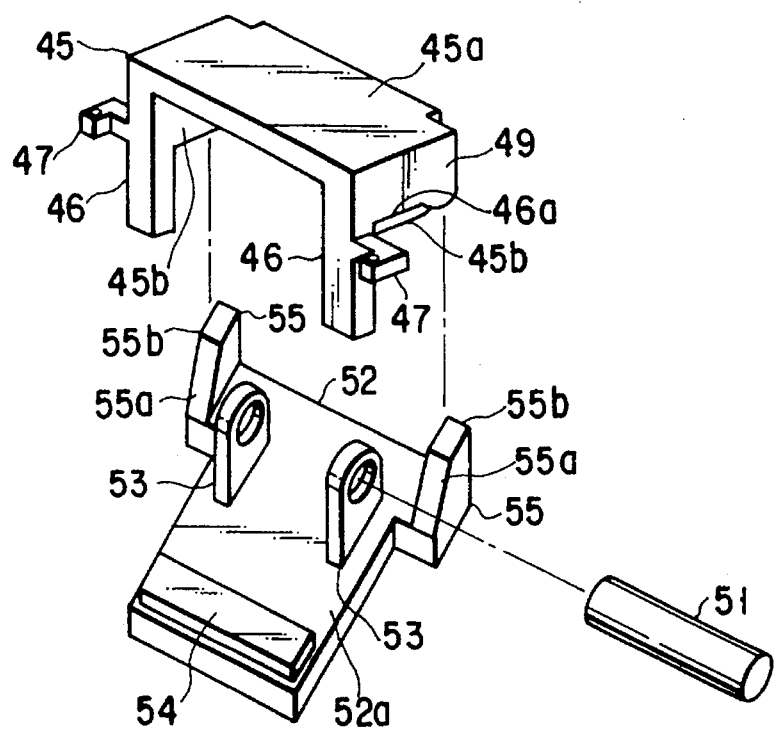
FIG. 6 is an exploded perspective view showing the main part of the IC card processing apparatus of the first embodiment.

A slide member 45 is mounted on the slide table 43. The slide table 43, as shown in FIG. 6, is constituted by an almost rectangular upper plate 45a and a pair of side plates 45b respectively extending downward from both the sides of the upper plate 45a. The slide table 43 is formed to have an almost U shape. The lower surface of the upper plate 45a is brought into contact with the upper surface of the slide table 43, and the slide table 43 is sandwiched by the slide member 45 and both the side plates 45b, so that the slide member 45 is supported to be slid back and forth.

Card receivers 46 vertically passing through the holes 42 on both the sides of the slide table 43 and extending to the card storage unit 34 are arranged at both the ends of the front portion of the upper plate 45a. These card receivers 46 are brought into contact with the leading end of a card inserted into the card storage unit 34 to slide the slide member 45 backward.

Spring hooks 47 are arranged at the middle portions of the card receivers 46, respectively, and springs 48 for returning the slide member 45 to a position where the card receivers 46 are brought into contact with the middle plate 33 when the card is removed suspend between the spring hooks 47 and the spring hooks 41 in the spring grooves 40 of the middle plate 33.

As shown in FIG. 6, cam portions 49 each having an arc-like outer periphery and brought into contact with a card pressing member 52 (to be described later) to pivot the card pressing member 52 when the slide member 45 is slid backward are formed on both the side plates 45b of the slide member 45, respectively.

Two bearings 50 extend from the lower surface of the slide table 43 along the widthwise direction of the slide table. A shaft 51 extends through the bearings 50, and the card pressing member 52 is pivotally supported by the shaft 51.

The card pressing member 52, as shown in FIG. 6, is formed like a T-shaped plate. Two bearings 53 extend from the upper portion of one surface 52a of the card pressing member 52, and an elastic member 54 consisting of rubber, sponge, or the like is fixed on the lower portion of the surface 52a. The card pressing member 52 is pivotally supported on the lower surface of the slide table 43 by the shaft 51 extending through the two bearings 53 such that the surface 52a faces the terminal plate 38.

On each side of the upper portion of the card pressing member 52, an opposing contact piece 55 extends toward one surface 46a of each side plate 45b of the slide member 45. The outer periphery of each of the contact pieces 55 is formed such that an inclined portion 55a inclined with respect to a corresponding one of the surfaces 46a is continuous with a parallel portion 55b parallel to the corresponding surface 46a. When the inclined portion 55a is in contact with the outer periphery of each cam portion 49 of the slide member 45, and the slide member 45 is slid backward, the card pressing member 52 is pivoted to being the lower portion of the card pressing member 52 close to the lower surface of the middle plate 33. When the slide member 45 is pressed to a position where its rear end is brought into contact with the inner wall of the rear portion of the frame, the card pressing member 52 becomes almost horizontal, and the parallel portion 55b is brought into contact with the cam portions 49.

A circuit board 60 is fixed on the upper surface of the middle plate 33. The circuit board 60 has a shape to cover the upper surface of the middle plate 33 and the holes 42 on both the sides of the slide table 43, and the upper surface side of the circuit board 60 is connected to one terminal of each of the contact terminals 39. In addition, a microswitch 61 serving as a sensor for detecting that a card is inserted deep is attached to the lower surface of the rear portion of the circuit board 60. In one of the holes 42 on both the sides of the slide table 43, the microswitch 61 is arranged at a position where the microswitch 61 is turned on by pressing a movable portion 61a of the microswitch 61 by the rear portion of one of the spring hooks 47 when the slide member 43 is pressed to the rearmost position.

Note that the contact terminals 39 and the microswitch 61 is connected to the control unit (not shown) of, e.g., a public telephone set, through the circuit board 60. This control unit controls normal speech communication and also determines insertion/removal of a card on the basis of the ON/OFF state of the microswitch 61 to update call rate information of an inserted card through the contact terminals 39.

The operation of the IC card processing apparatus 20 according to the first embodiment will be described below.

Figure 7A:
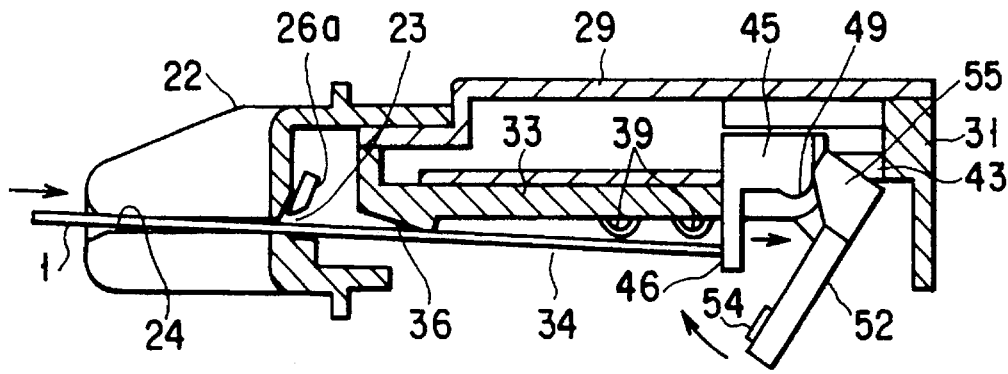
FIGS. 7A and 7B are schematic side views showing the IC card processing apparatus of the first embodiment when a proper card is inserted into the IC card processing apparatus.

When the IC card 1 is inserted into the card insertion port 23 such that both the sides of the IC card 1 are supported by the guide grooves 24 of the card slot 22, the shutter lever 26b is pressed upward, and the shutter plate 26a is retracted upward from the rear portion of the card insertion port 23, thereby guiding the card into the card storage unit 34. The card inserted into the card storage unit, as shown in FIG. 7A, passes below the contact terminals 39 while the card is slightly pressed downward by the inclined portions 36, and the leading end of the card is brought into contact with the card receivers 46 of the slide member 45.

Figure 7B:
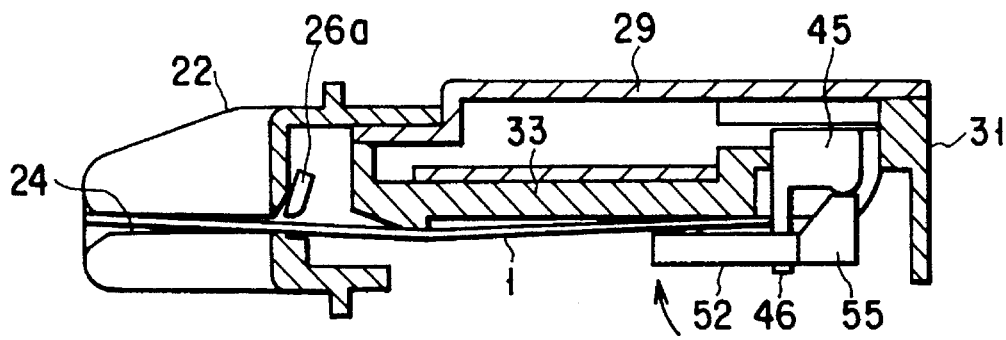

When the card is inserted deeper, the card presses the slide member 45 to slide the slide member 45 backward, and the card pressing member 52 having the inclined portions 55a of the contact pieces 55 circumscribed to the cam portions 49 of the slide member 45 is pivoted to bring one surface of the card pressing member 52 close to the terminal plate 38. As shown in FIG. 7B, when the slide member 45 is slid to a position where the slide member 45 is brought into contact with the inner wall of the rear portion of the frame 31, the card pressing member 52 is pivoted to be kept almost horizontal, and the card 1 is pressed upward from the lower surface by the elastic member 54, thereby bringing external terminals 2 of the card into contact with the contact terminals 39, respectively.

At this time, the middle portion of the card 1 is slightly pressed downward by the inclined portions 36, and the external terminal portion is pressed upward by the card pressing member 52. For this reason, a force for bending the card acts on the contact portions between the card and the inclined portions 36. However, this force is weak, and no integrated circuit is incorporated in the contact portion of the card. Therefore, the card is not disabled.

In addition, the returning force of the slide member 45 generated by the springs 48 is preset to be weaker than a friction force acting on the card and generated by slightly bending the card 1, and the cam portions 49 of the slide member 45 are kept in contact with the parallel portions 55*b* of the contact pieces 55 of the card pressing member 52 and receive only the upward moments of the card pressing member 52. For this reason, if the card is left in this state, the card will not return.

Note that, in this state, the movable portion 61*a* is pressed by one of the spring hooks 47 of the slide member 45 to turn on the microswitch 61.

When it is detected that the microswitch 61 is turned on, call rate information of the memory in the IC card is read out through the contact terminals 39, and a process of subtracting a charge amount is performed. Upon completion of speech communication, when the card is removed, the slide member 45 is returned forward by the springs 48, and the microswitch 61 is turned off. The card pressing member 52 is pivoted by its own weight, and the card pressing member 52 is returned to the original state (state shown in FIG. 2).

Figure 8:
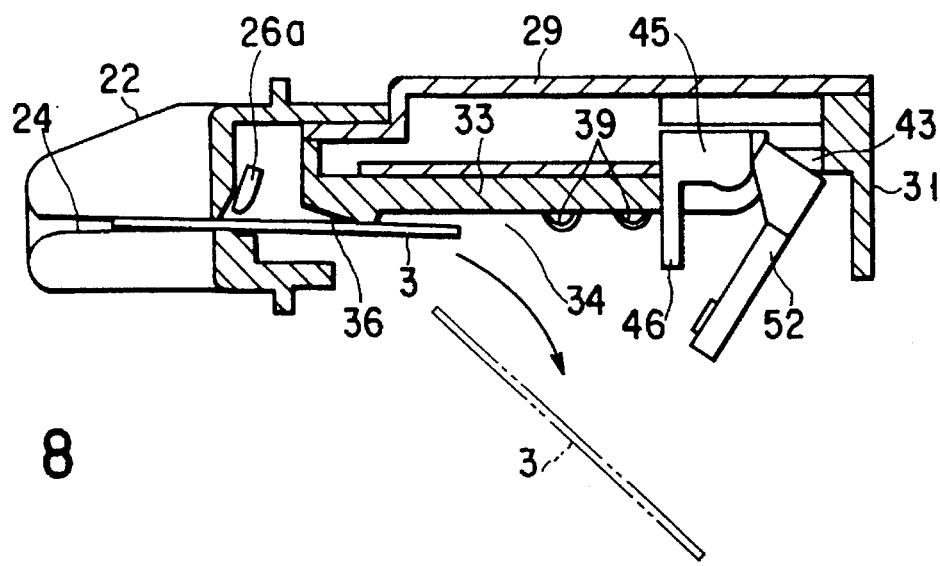
FIG. 8 is a schematic side view showing the IC card processing apparatus of the first embodiment when a wrong card is inserted into the IC card processing apparatus.
Figure 9:
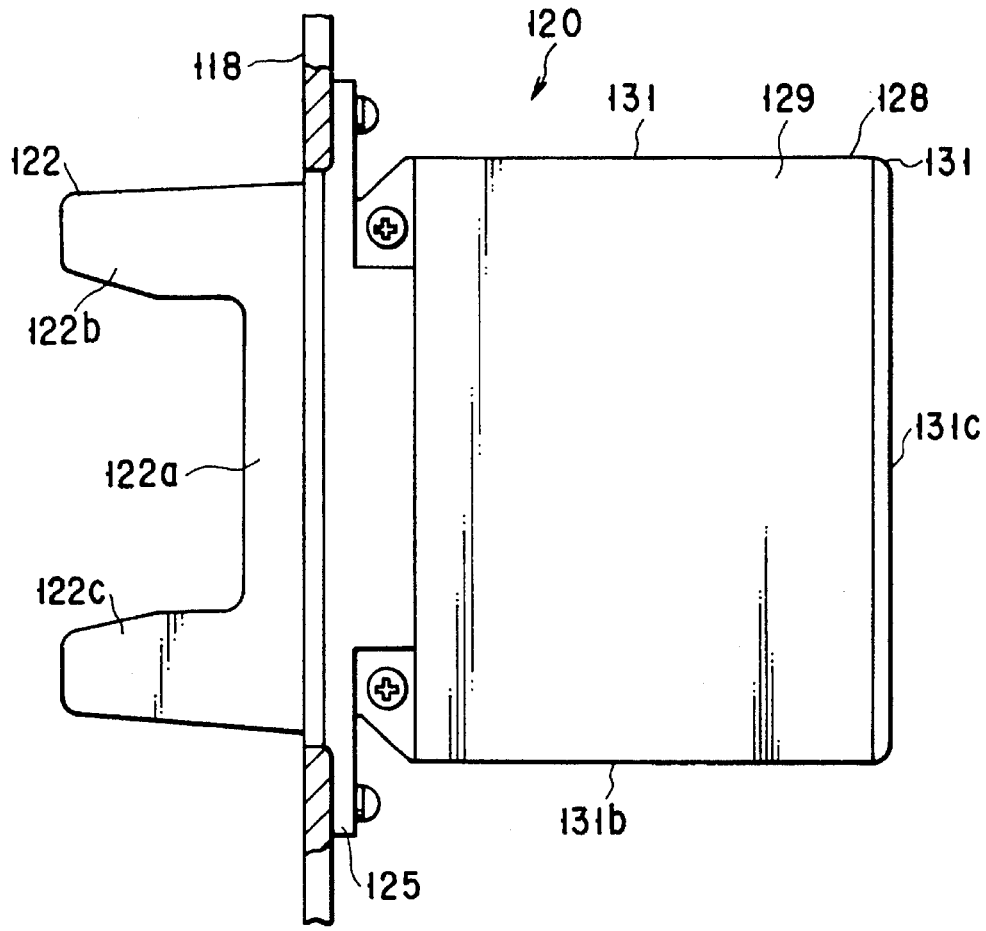
FIG. 9 is a plan view showing an IC card processing apparatus according to the second embodiment of the present invention.
Figure 10:
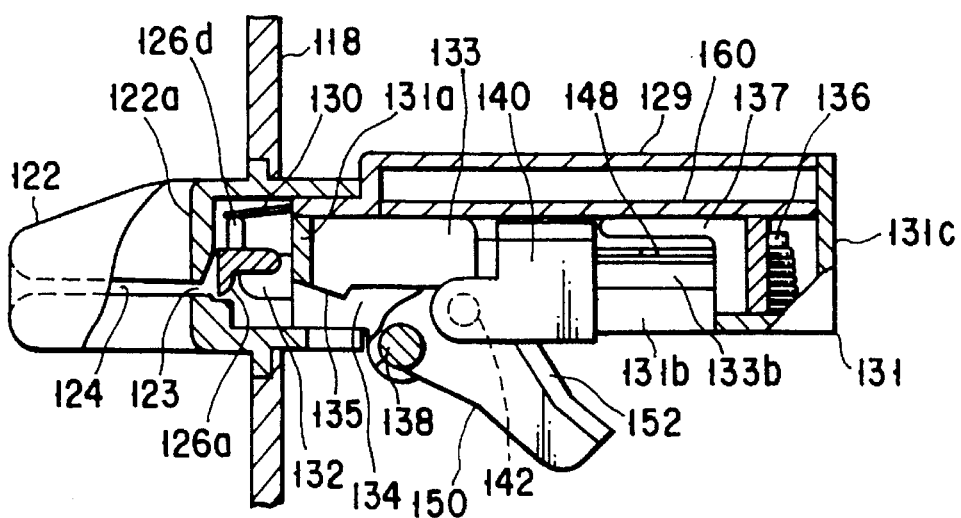
FIG. 10 is a partially cutaway side view showing the IC card processing apparatus of the second embodiment.

For example, as shown in FIG. 8, when a wrong card 3 having a length smaller than the distance from the card insertion port 23 to the card receivers 46 is inserted from the card insertion port 23, the trailing end of the wrong card 3 enters the card storage unit 34 before the wrong card 3 reaches the card receivers 46 of the slide member 45. For this reason, the wrong card is discharged downward from the open lower surface of the card storage unit 34. Therefore, the wrong card 3 does not adversely affect the next card insertion, and use of the apparatus is not disabled.

When a wrong card having a length larger than the distance from the card insertion port 23 and the card receivers 46 and smaller than that of a proper card is inserted from the card insertion port 23, this card cannot completely press the slide member 45 to the rearmost position. For this reason, a force for returning the card is always generated by the springs, and this wrong card is discharged when a hand is removed from the wrong card. In addition, assuming that the wrong card is forcibly inserted from the card insertion port 23 to close the shutter plate 26*a*, when a next card is inserted to retract the shutter plate 26*a* upward, the wrong card is returned to the card insertion port 23. Otherwise, the trailing end of the wrong card is moved upward by the shutter plate 26*a*, and the leading end of the wrong card is slid below the card receivers 46, thereby discharging the wrong card from the opening portion of the card storage unit 34. For this reason, the next card insertion can be performed without any trouble.

As has been described above, in this IC card processing apparatus, even when a forcible external force does not act on a proper card, the proper card can be certainly received to a position where the external terminals are brought into contact with the contact terminals, respectively, and a card jam caused by a wrong card which is intentionally cut to have a small length can be prevented.

In the first embodiment, an IC card inserted from the card insertion port is guided into the card storage unit such that the IC card is slightly moved downward. However, the present invention is not limited to the first embodiment. For example, in place of the inclined portions 36 of the middle plate 33, a mechanism (cam mechanism, link mechanism, or the like) interlocked with the sliding operation of the slide member 45 to move downward the contact terminals or a terminal plate supporting the contact terminals may be arranged. In this state, the lower surface of the inserted card may be pressed upward by the card pressing member 52 to move the contact terminals downward, thereby bringing the contact terminals into contact with the external terminals, respectively. In this manner, any bending force need not act on the inserted card.

In the first embodiment, although the card slot 22 having the card insertion port and the frame 31 are formed as different units, they may be integrally formed. In addition, the shapes of the card slot 22 and the frame 31 can be variably changed.

In the first embodiment, the present invention is applied to an IC card processing apparatus for manually inserting and removing a card. However, the present invention can be applied to the hollowing IC card processing apparatus. That is, in the IC card processing apparatus, a mechanism for conveying an inserted card is arranged between a card insertion port and a card storage unit, the card inserted from the card insertion port is received into the card storage unit, and the card from/in which information has been read/ written is discharged from the card insertion port or a card discharge port.

In the first embodiment, a card processing apparatus for performing read/write process to, e.g., a prepaid IC card has been described. However, the present invention can be similarly applied to card processing apparatuses for reading information from various cards including magnetic cards, optical cards and IC cards such as an IC card serving as an IC card for identifying an individual.

As has been described above, in an IC card processing apparatus according to the first embodiment of the present invention, a card inserted from a card insertion port is guided to a card storage unit having an opening formed in the lower surface thereof, and a slide member brought into contact with the leading end of the card is slid backward to pivot a card pressing member. The inserted card is pressed from the lower surface onto contact terminals arranged at the upper portion of the card storage unit, thereby bringing the external terminals of the card into contact with the contact terminals, respectively.

For this reason, in the IC card processing apparatus according to the first embodiment of the present invention, a proper card can be certainly received to a terminal contact position without causing a force for forcibly bending the external terminal portion of the proper IC card to act on the proper IC card, and a card jam caused by inserting a wrong card shorter than the proper card can be prevented.

The second embodiment of the present invention will be described below with reference to the accompanying drawings.

FIGS. 9 to 15 show an IC card processing apparatus 120 according to the second embodiment of the present invention. This IC card processing apparatus 120 is arranged in a housing 118 of a public telephone set used by a user with a prepaid IC card, for example. An IC card manually inserted by the user is received to a position where the IC card can be removed after the public telephone set is used, and call rate information recorded on the IC card is update.

The IC card processing apparatus 120 is constituted by a card slot 122 fixed to project from the housing 118 to receive the IC card from the outside and a housing 128 fixed to the rear portion of the card slot 122.

The card slot 122 is constituted by a base portion 122a having a card insertion port 123 formed on the front surface side thereof and opposing projecting portions 122b and 122c projecting forward from both the sides of the base portion 122a. The card slot 122 is formed to have an almost U shape when viewed from the upper direction. The interval between the opposing surfaces of the two projecting portions 122b and 122c is set to be smaller than the width of the IC card. Guide grooves 124, communicating with the card insertion port 123, for horizontally guiding the IC card inserted from the user side are arranged on the opposing surfaces of the projecting portions, respectively.

Flanges 125 are arranged on both the sides of the card slot 122. Since the flanges 125 are mounted on the inner surface side of the housing 118 with screws or the like, the IC card processing apparatus 120 is entirely supported by the housing 118.

Figure 11:
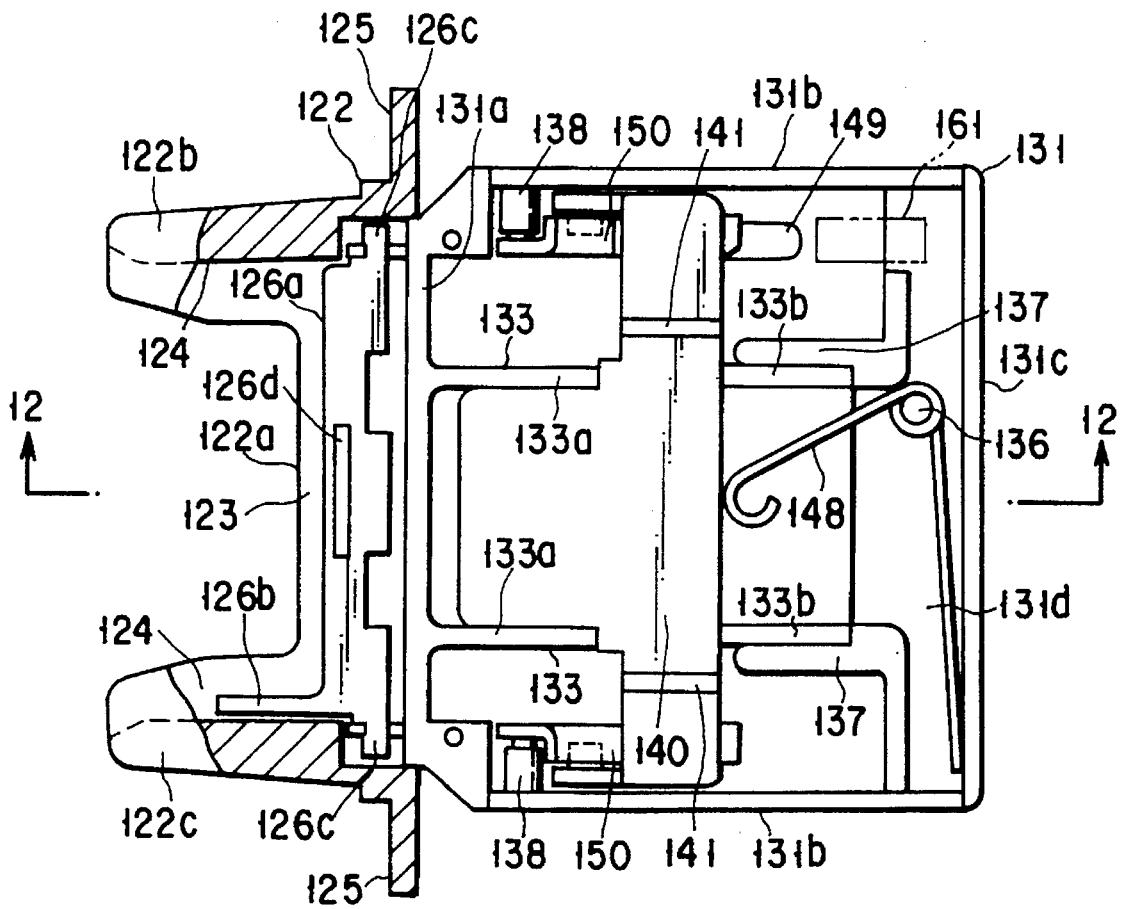
FIG. 11 is a plan view showing the IC card processing apparatus of the second embodiment in which a cover and a circuit board are not illustrated.
Figure 12:
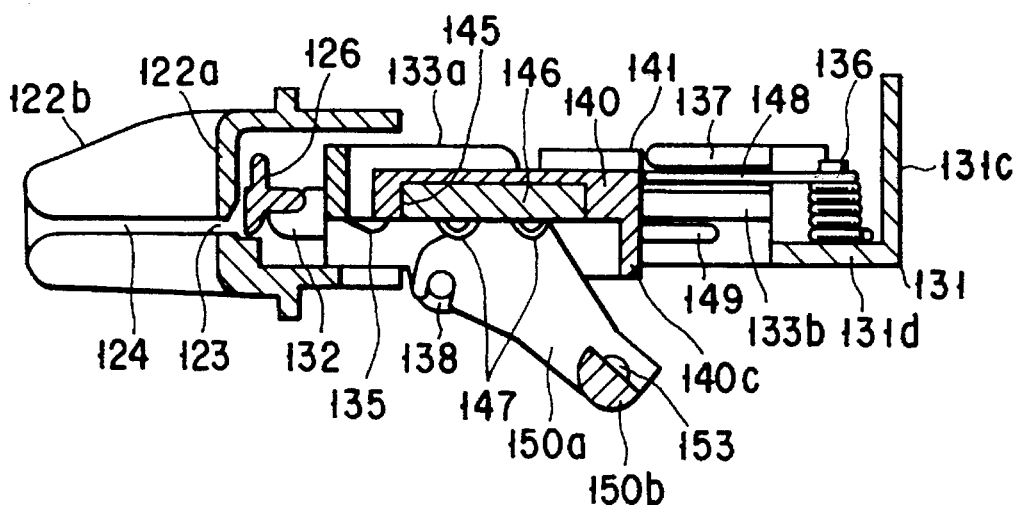
FIG. 12 is a sectional view showing the IC card processing apparatus along a line 12—12 in FIG. 11.
Figure 13:
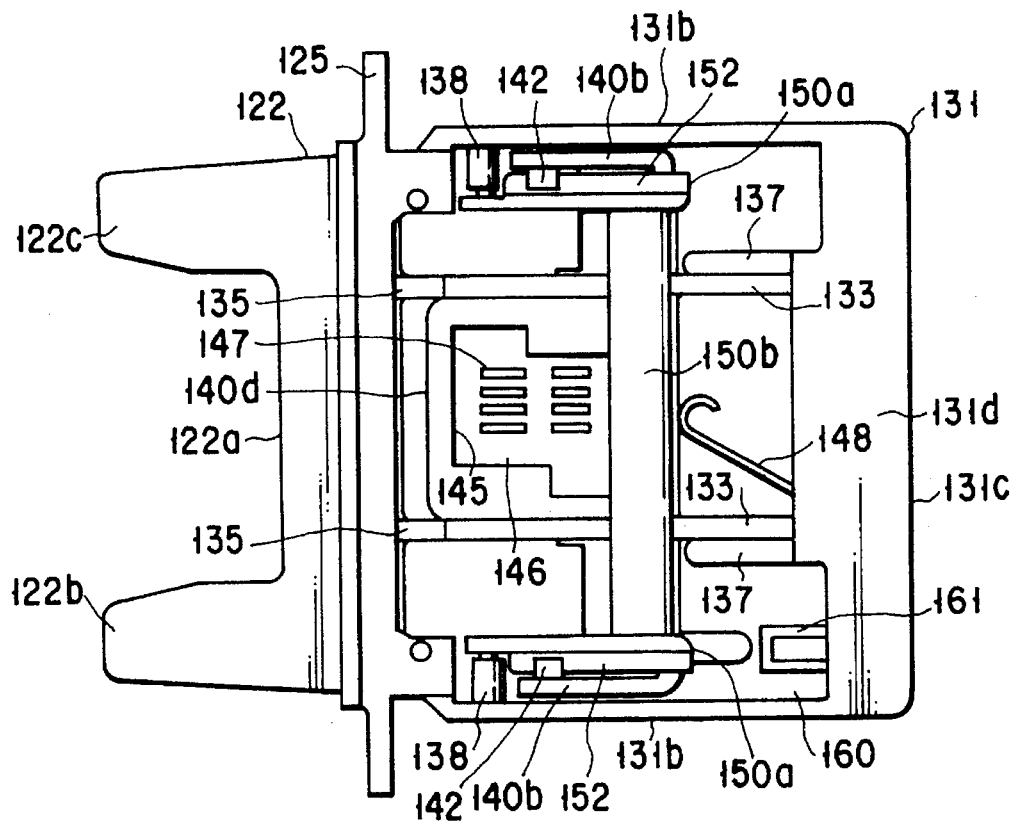
FIG. 13 is a bottom view showing the IC card processing apparatus of the second embodiment.
Figure 14:
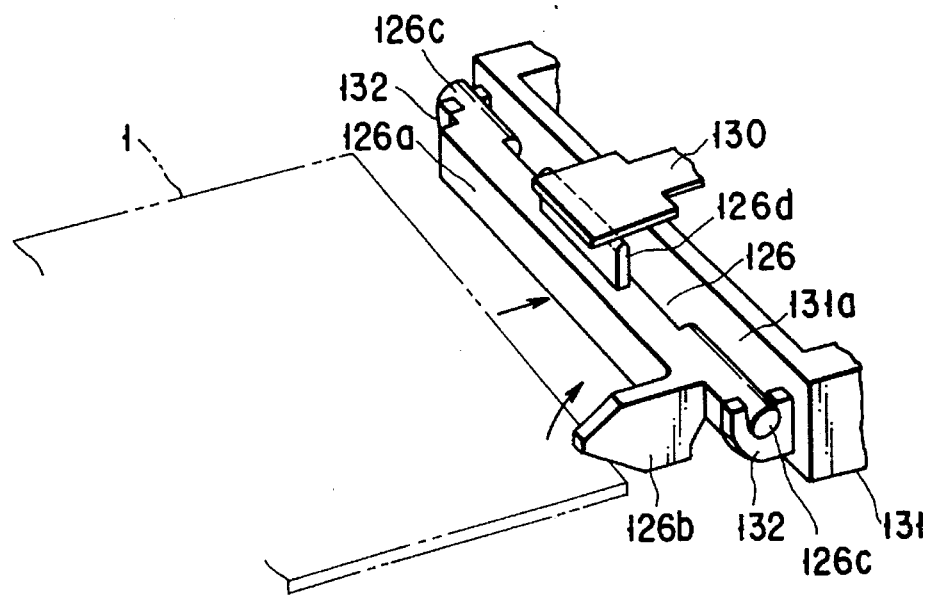
FIG. 14 is a perspective view showing the main part of the IC card processing apparatus of the second embodiment.

A shutter member 126 is arranged behind the card insertion port 123. The shutter member 126, as shown in FIGS. 11 and 14, is integrally formed by a shutter plate 126a having a long side extending in the horizontal direction to close the card insertion port 123, a shutter lever 126b extending from one end of the shutter plate 126a toward the projecting portion 122c of the card slot 122 and having an inclined lower portion projecting toward the guide groove 124 of the projecting portion 122c, shafts 126c extending from both the ends of the shutter plate 126a in the side direction, and a projection 126d extending upward from the upper central end of the shutter plate 126a.

Note that the shafts 126c are pivotally supported by bearings 132 of a frame 131 (to be described later). The upper end of the projection 126d is in contact with the lower surface of a leaf spring 130 attached to a cover 129 (to be described later), and this leaf spring 130 biases the shutter member such that the shutter plate 126a and the shutter lever 126b face downward, i.e., a force for closing the card insertion port 123 acts on the shutter member.

In this shutter member 126, when the IC card having a proper width is inserted to be supported between the guide grooves 124 of the card slot 122, the shutter lever 126b is pressed upward by a card passing through the guide groove 124 of the projecting portion 122b and pivoted upward using the shafts 126c on both the ends as fulcrums to retract the shutter plate 126a upward, thereby opening the card insertion port 123. When a piece of paper or the like having a width smaller than that of the proper IC card is to be directly inserted in the card insertion port 123, the shutter lever 126b is not pressed upward. For this reason, the card insertion port 123 is kept closed by the shutter plate 126a, and the piece of paper or the like can be prevented from being inserted from the card insertion port 123.

The housing 128 fixed on the rear portion of the card slot 122 is constituted by the cover 129 and the frame 131 whose upper surface is covered with the cover 129.

The cover 129 is fixed to have a stepped-down front portion brought into contact with the inner wall of the upper portion of the base portion 122a of the card slot 122. The leaf spring 130 for pressing the shutter member 126 downward is attached to the upper surface of the front end of the cover 129.

The frame 131 is formed by a front plate 131a, side plates 131b, and a rear plate 131c to have an almost rectangular frame-like shape. The lower surface of the frame 131 is open except for a portion of a bottom plate 131d slightly extending forward from the lower end of the rear plate 131c.

The bearings 132 for supporting the shafts 126c of the shutter member 126 extend from both the ends of the front plate 131a. The interior of the frame is partitioned into three parts in the widthwise direction by two parallel middle plates 133. A card inserted from the card insertion port 123 and passing through the lower portion of the front plate 131a is surrounded by the lower surfaces of the middle plates 133 and the side plates 131b of the frame 131 and received into a card storage unit 134 having a large opening formed in a lower surface thereof.

High step portions 133a extending to a position to sandwich the front portion of the cover 129 with the upper wall of the base portion of the card slot 122 are arranged at the front portion of the middle plates 133, respectively. Rail portions 133b, formed at a level lower than that of the high step portions 133a by one step, for supporting a slide member 140 (to be described later) to be slid back and forth are arranged at the rear portions of the middle plates 133, respectively.

Inclined portions 135 inclined downward toward the rear portion extend from the front ends of the lower surfaces of the high step portions 133a, respectively. In order to prevent contact terminals 147 (to be described later) from being deformed such that the contact terminals 147 are directly pressed by the leading end of the inserted card, the inclined portions 135 guide the leading end of the card inserted from the card insertion port 123 to separate the leading end of the card from the lower surfaces of the middle plates 133.

A spring shaft 136 vertically extends from the upper portion of the bottom plate 131d of the frame 131. On both the sides of the spring shaft 136, guide projections 137 extending with an interval slightly larger than that of the middle plates 133 toward the card slot are formed to guide the backward movement of the slide member 140 (to be described later) on the upper sides of the guide projections 137. Support shafts 138 for pivotally supporting a card pressing member 150 (to be described later) extend from the front ends of the inner walls of the side plates 131b of the frame 131, respectively.

The slide member 140 is mounted to be slid back and forth on the rail portions 133b of the middle plates 133 of the frame 131. The slide member 140, as shown in FIG. 15, is integrally formed by an upper plate 140a formed to have an almost T shape when viewed from the upper direction, side plates 140b, and a rear plate 140c extending vertically downward from the rear end of the upper plate 140a.

The upper plate 140a has a width larger than that of an IC card, and a central portion 140d of the upper plate 140a largely extends forward with a width almost equal to the interval between the middle plates 133 of the frame 131. Ribs 141 extend from the upper surface of the upper plate 140a with an interval such that the ribs 141 are circumscribed to the guide projections 137, respectively.

Column-like shafts 142 for pivoting the card pressing member 150 (to be described later) extend inward from the inner sides on the distal end sides of both the side plates 140b of the slide member 140. In addition, slits 143 for receiving the rail portions 133b of the middle plates 133 from the lower direction and regulating the lateral movement of the slide member 140 to move the slide member 140 in only the forward and backward directions are formed in the rear plate 140c. The rear plate 140c is located at a position where the rear plate 140c traverses the card storage unit 134, and the rear plate 140c is brought into contact with the leading end of the card inserted from the card insertion port to transmit a force of a card insertion direction to the slide member 140.

A terminal plate mounting hole 145 is formed to be recessed in a predetermined depth on the lower surface side of the central portion 140*d* of the slide member 140. A terminal plate 146 is fixed in the terminal plate mounting hole 145 with screws.

Contact terminals 147 to be brought into contact with the external terminals of the an IC card, respectively, are arranged in a 2×4 matrix on the lower surface side of terminal plate 146. Each of the contact terminals 147 consists of a conductive material (e.g., phosphor bronze or the like) having spring characteristics and is formed to be bent in a V shape. One end of each contact terminal 147 is fixed on the terminal plate 146, and the other end is inserted in a corresponding one of terminal holes (not shown) formed in the terminal plate 146, so that the contact terminals 147 are supported by the terminal plate 146. When the contact terminals 147 are pressed from the lower direction, the contact terminals 147 are moved upward while the contact terminals 147 are elastically deformed, and the elastic restoring force of the contact terminals 147 opposes the pressing force from the lower direction.

Note that one end of a spring 148 hooked on the spring shaft 136 is brought into contact with the rear plate 140*c* of the slide member 140 from the backward direction, and the slide member 140 is always biased toward the card insertion port by the elastic force of the spring 148. In addition, a projection 149 for turning on a microswitch 161 (to be described later) when the slide member 140 is pressed to the rearmost position extends backward from the rear plate 140*c*.

The card pressing member 150 is arranged below the slide member 140. The card pressing member 150, as shown in FIG. 15, is integrally formed by opposing arm plates 150*a* arranged with an interval smaller than the interval between the side plates 140*b* of the slide member 140 and slightly larger than the width of an IC card and a semi-columnar elongated plate 150*b* for connecting the distal ends of the two arm plates 150*a* to each other.

Each of the arm plates 150*a* is formed to have a height decreased from one end to the other end, and each bearing 151 fitted on a corresponding one of the support shafts 138 of the frame 131 is formed in the lower portion of one end of a corresponding one of the arm plates 150*a*. In addition, contact pieces 152 projecting outward with a predetermined width are formed on the upper edges of the arm plates 150*a*, respectively.

The contact pieces 152 are pressed by the shafts 142 of the slide member 140 to transmit a rotating force to the card pressing member 150, and each of the contact pieces 152 is constituted by a parallel portion 152*a* parallel to the upper surface of the pressing plate 150*b* and an inclined portion 152*b* inclined from one end to the other end of the arm plate 150*a* and continuous with the contact pieces 152. Note that two elastic members 153 which consist of rubber or sponge and are linearly arranged are fixed on the upper surface of the pressing plate 150*b*.

When the slide member 140 is in contact with the high step portions 133*a* of the middle plates 133, the shafts 142 of the slide member 140, as shown in FIG. 16A, are located at the lower portions of the contact pieces 152 of the arm plates 150*a*, respectively. When the slide member 140 is slid backward, and the shafts 142 are moved backward while the shafts 142 are brought into contact with the lower surfaces of the inclined portions 152*b*, the card pressing member 150 is pivoted counterclockwise. The card pressing member 150, as shown in FIG. 16B, is pivoted until the shafts 142 reach the lower surfaces of the parallel portions 152*a* of the contact pieces 152 to set the upper surface of the pressing plate 150*b* to be horizontal, thereby pressing the lower surface of an inserted card upward.

A circuit board 160 is fixed on the high step portions 133*a* of the middle plates 133 and the upper surfaces of the guide projections 137. The circuit board 160 is connected, through, e.g., a flexible board (not shown), to the contact terminals 147 attached to the slide member 140. In addition, the microswitch 161 serving as a sensor for detecting that a card is inserted deep is attached to the lower surface of the rear portion of the circuit board 160. The microswitch 161 is arranged at a position where the microswitch 161 is turned on by pressing its movable portion by the projection 149 when the slide member 140 is pressed to the rearmost position.

Note that the contact terminals 147 and the microswitch 161 are connected to the control unit (not shown) of a public telephone set through the circuit board 160, for example. This control unit controls normal speech communication and also determines insertion/removal of a card on the basis of the ON/OFF state of the microswitch f161 to update call rate information of an inserted card through the contact terminals 147.

The operation of the IC card processing apparatus 120 according to the second embodiment will be described below.

When an IC card 1 is inserted into the card insertion port 123 such that both the sides of the IC card 1 are supported by the guide grooves 124 of the card slot 122, the shutter lever 126*b* is pressed upward, and the shutter plate 126*a* is retracted upward from the rear portion of the card insertion port 123, thereby guiding the card into the card storage unit 134.

Figure 17A:
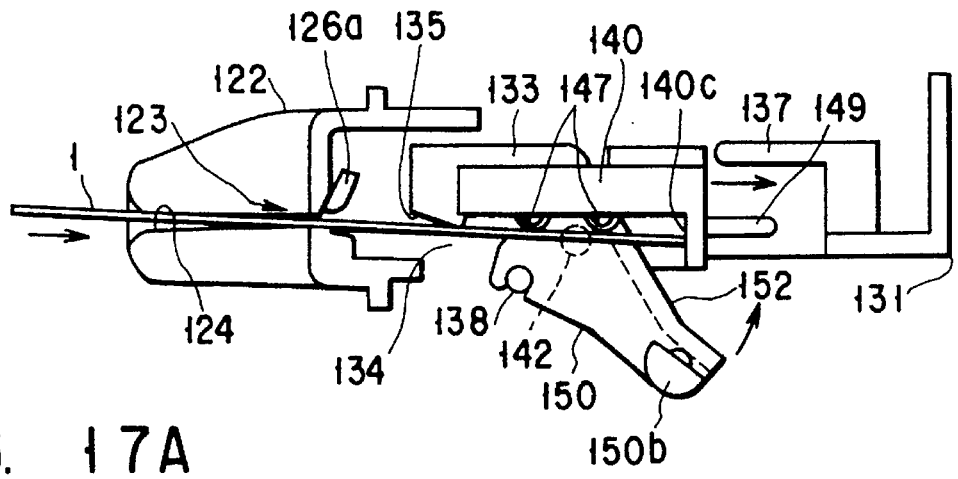
FIGS. 17A and 17B are schematic side views showing the IC card processing apparatus of the second embodiment when a proper card is inserted into the IC card processing apparatus.

The card inserted into the card storage unit 134, as shown in FIG. 17A, passes through the lower portion of the contact terminals 147 while the card is slightly pressed downward by the inclined portions 135, and the leading end of the card is brought into contact with the rear plate 140*c* of the slide member 140.

When the card is inserted deeper, the card presses the slide member 140 to slide the slide member 140 backward, and the shafts 142 of the slide member 140 are brought into contact with the inclined portions 152*b* of the contact pieces 152 of the card pressing member 150, and the card pressing member 150 is pivoted such that the pressing plate 150*b* is brought close to the lower surface of the slide member 140. Note that, in this sliding operation, the upward movement of the slide member 140 is regulated by the lower surface of the circuit board 160 and the guide projections 137.

Figure 17B:
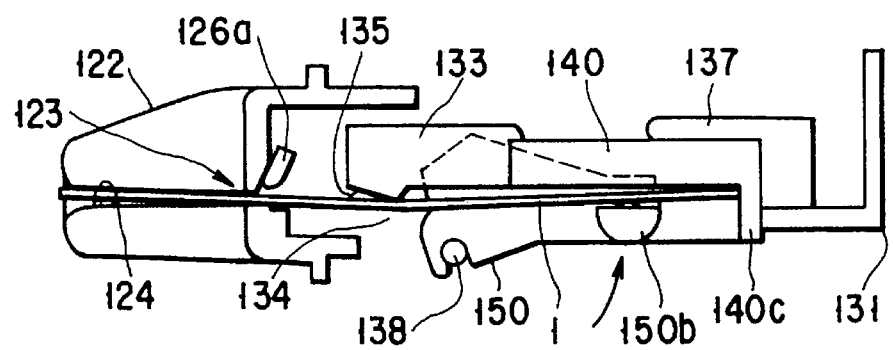

As shown in FIG. 17B, when the slide member 140 is slid to a position such that the slide member 140 is brought into contact with the vertical upright portions of the guide projections 137 of the frame 131, the card pressing member 150 is pivoted until the upper surface of the pressing plate 150*b* of the card pressing member 150 is set to be almost horizontal, and the card 1 is pressed upward from the lower surface by the elastic member 153, thereby bringing external terminals 2 of the card 1 into contact with the contact terminals 147, respectively.

At this time, the middle portion of the card 1 is slightly pressed downward by the inclined portions 135, and the external terminal portion is pressed upward by the card pressing member 150. For this reason, a force for bending the card acts on the contact portions between the card and the inclined portions 135. However, this force is weak, and no integrated circuit is incorporated in the contact portion of the card. Therefore, the card is not disabled.

In addition, the returning force of the slide member 140 generated by the spring 148 is preset to be weaker than a friction force acting on the card and generated by slightly bending the card 1, and the shafts 142 of the slide member 140 are kept in contact with the parallel portions 152a of the contact pieces 152 of the card pressing member 150 and receive only the downward moments of the card pressing member 150. For this reason, if the card is left in this state, the card will not return.

In this state, the microswitch 161 is pressed by the projection 149 of the slide member 140 to turn on the microswitch 161.

When it is detected that the microswitch 161 is turned on, call rate information of the memory in the IC card is read out through the contact terminals 147, and a process of subtracting a charge amount. Upon completion of speech communication, when the card is removed, the slide member 140 is returned forward by the spring 148, and the microswitch 161 is turned off. The card pressing member 150 is pivoted by its own weight, and the card pressing member 150 is returned to the original state (state shown in FIG. 10).

Figure 18:
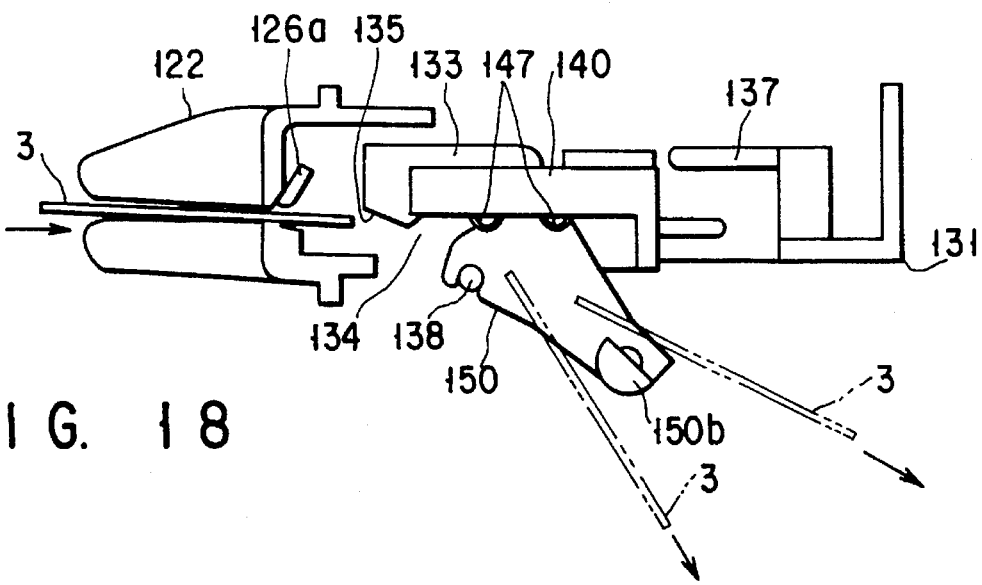
FIG. 18 is a schematic side view showing the IC card processing apparatus of the second embodiment when a wrong card is inserted into the IC card processing apparatus.

For example, as shown in FIG. 18, when a wrong card 3 having a length smaller than the distance from the card insertion port 123 to the rear plate 140c of the slide member 140 is inserted from the card insertion port 123, the trailing end of the wrong card 3 enters the card storage unit 134 before the wrong card 3 reaches the rear plate 140c. For this reason, the wrong card is discharged downward from the open lower surface of the card storage unit 134. Therefore, the wrong card 3 does not adversely affect the next card insertion, and use of the apparatus is not disabled.

When a wrong card having a length larger than the distance from the card insertion port 123 and the rear plate 140c of the slide member 140 and smaller than that of a proper card is inserted from the card insertion port 123, this card cannot completely press the slide member 140 to the rearmost position. For this reason, a force for returning the card is always generated by the spring 148, and this wrong card is discharged when a hand is removed from the wrong card. In addition, assuming that the wrong card is forcibly inserted from the card insertion port 123 to close the shutter plate 126a, when a next card is inserted to retract the shutter plate 126a upward, the wrong card is returned to the card insertion port 123. Otherwise, the trailing end of the wrong card is moved upward by the shutter plate 126a, and the leading end of the wrong card is slid below the rear plate 140c of the slide member 140, thereby discharging the wrong card from the opening portion of the card storage unit 134. For this reason, the next card insertion can be performed without any trouble.

As has been described above, in this IC card processing apparatus, even when a forcible external force does not act on a proper card, the proper card can be certainly received to a position where the external terminals are brought into contact with the contact terminals, respectively, and a card jam caused by a wrong card which is intentionally cut to have a small length can be prevented.

In the second embodiment, an IC card inserted from the card insertion port is guided into the card storage unit such that the IC card is slightly moved downward. However, the present invention is not limited to the second embodiment. For example, in place of the inclined portions 135 of the middle plates, a mechanism (cam mechanism, link mechanism, or the like) interlocked with the sliding operation of the slide member 140 to move downward the contact terminals or a terminal plate supporting the contact terminals may be arranged. In this state, the lower surface of the inserted card may be pressed upward by the card pressing member 150 to move the contact terminals downward, thereby bringing the contact terminals into contact with the external terminals, respectively. In this manner, any bending force need not act on the inserted card.

In the second embodiment, although the card slot having the card insertion port and the frame are formed as different units, they may be integrally formed. In addition, these shapes of parts including the card pressing member are not limited to the second embodiment, and the shapes can be variably changed.

Figure 19:
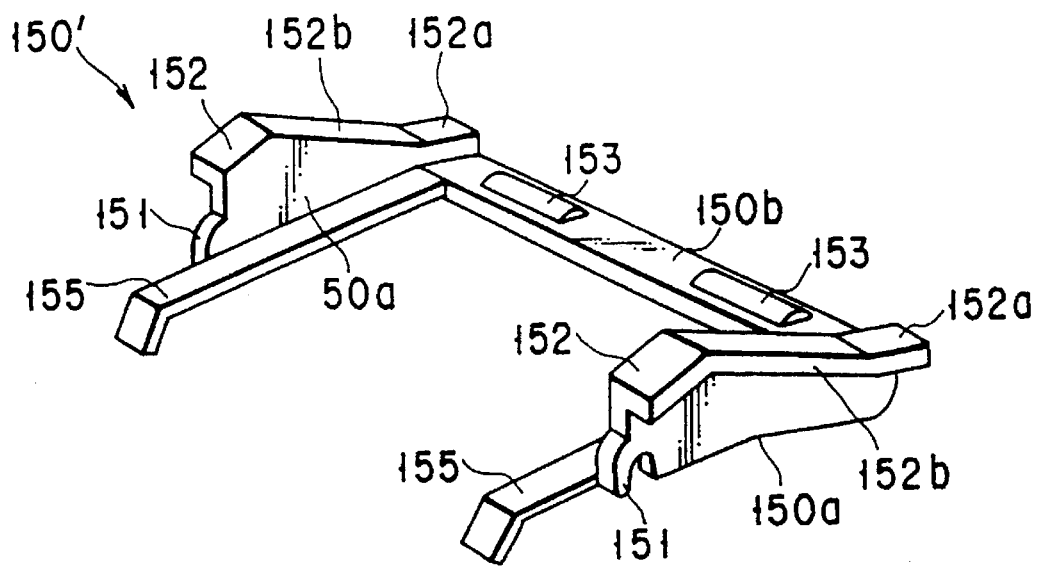
FIG. 19 is a perspective view showing a modification of the pressing member in the IC card processing apparatus of the second embodiment.
Figure 20:
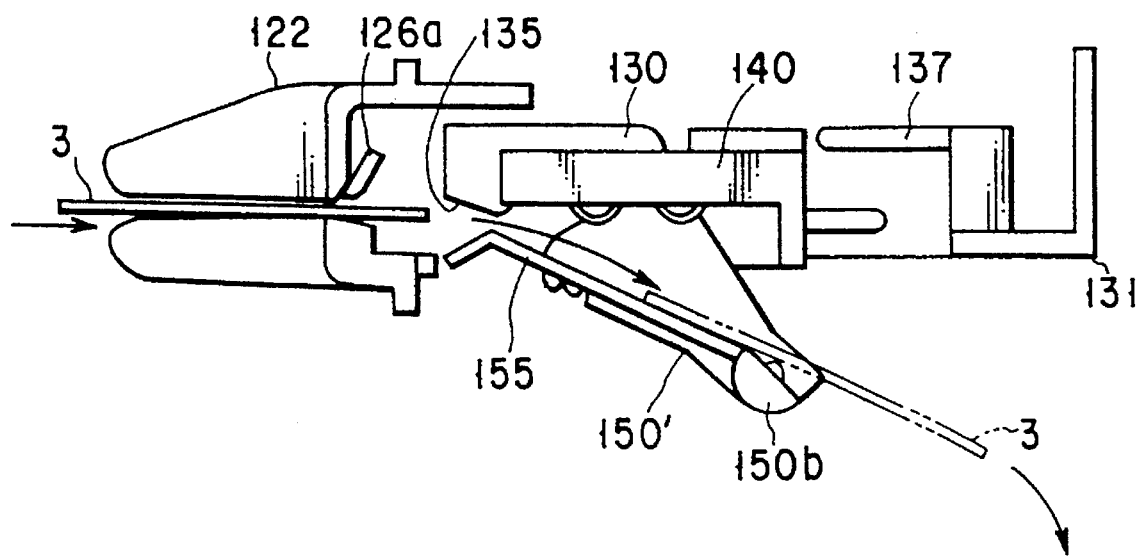
FIG. 20 is a schematic side view showing the IC card processing apparatus using the card pressing member in FIG. 19 when a wrong card is inserted into the IC card processing apparatus.

For example, as shown in FIG. 19, a card pressing member 150' having guide plates 155 for discharging a wrong card on the inner wall sides of both the arm plates 150a may be used. In use of this card pressing member 150', as shown in FIG. 20, when the wrong card 3 having a small length is inserted from the card insertion port 123, this card passes between the inclined portions 135 and one end of each of the guide plates 155, the card 3 is discharged in a predetermined inclined lower direction while both the ends of the lower surface of the card 3 are supported by the upper surface of the guide plates 155. In addition, a wrong card having a width smaller than the interval between the guide plates 155 is discharged downward from the interval therebetween. Note that the guide plates 155 are connected to the upper surface of the pressing plate 150b at an angle such that the wrong card slid on the guide plates 155 passes above the elastic members 153 on the pressing plate 150b.

In addition, when the elastic members 153 are not used, the angle between each of the guide plates 155 and the upper surfaces of the pressing plate 150b can be set such that the guide plates 155 and the card pressing member 150 are linearly arranged. With this arrangement, a wrong card can be discharged in the same manner as described above. Moreover, when a proper card is inserted, the arm plates 150a and the guide plates 155 press upward both the ends of the lower surface of the card in a wide range. For this reason, the card can be brought into contact with the contact terminals while the card has a stabler posture.

In the second embodiment, the present invention is applied to an IC card processing apparatus for manually inserting and removing a card. However, the present invention can be applied to the following IC card processing apparatus. That is, in the IC card processing apparatus, a mechanism for conveying an inserted card is arranged between a card insertion port and a card storage unit, the card inserted from the card insertion port is received into the card storage unit, and the card from/in which information has been read/written is discharge from the card insertion port or a card discharge port.

In the second embodiment, a card processing apparatus for performing a read/write process to, e.g., a prepaid IC card has been described. However, the present invention can be similarly applied to card processing apparatuses for reading information from various cards including magnetic cards, optical card, and IC cards such as an IC card serving as an ID card for identifying an individual.

As has been described above, in an IC card processing apparatus according to the second embodiment of the present invention, a card inserted from a card insertion port is guided to a card storage unit having an opening formed in the lower surface thereof, and a slide member brought into contact with the leading end of the card is slid backward to pivot a card pressing member. The inserted card is pressed from the lower surface onto contact terminals arranged at the upper portion of the card storage unit, thereby bringing the external terminals of the card into contact with the contact terminals, respectively.

For this reason, in the IC card processing apparatus according to the second embodiment of the present invention, a proper card can be certainly received to a terminal contact position without causing a force for forcibly bending the external terminal portion of the proper IC card to act on the proper IC card, and a card jam caused by inserting a wrong card shorter than the proper card can be prevented.

It should be noted that, in each of the first and second embodiments, as shown in FIG. 5 (14), in association with the card slot (member) 22 (122) having the card insertion port 23 (123), and the pair of guide grooves 24 (124) arranged opposite to each other to guide the card inserted into the card insertion port 23 (123) while regulating movement of the card in the widthwise direction perpendicular to the card insertion direction, the card receiving mechanism is constituted by only the shutter member 26 (126) having the shutter lever (portion) 26b (126b) arranged near at least one of the pair of guide grooves 24 (124) near the card insertion port 23 (123) and brought into contact with the inserted and guided card to be moved in the direction of card thickness, and the shutter plate 26a (126a) which is integrally formed by the shutter lever (portion) 26b (126b), located behind a contact point with the shutter lever (portion) 26b (126b) so as to shield at least part of the card insertion port 23 (123), and actuated to open the shielded portion of the card insertion port 23 (123) with movement of the shutter lever (portion) 26b (126b) in the direction of card thickness upon insertion of the card; and the leaf spring (biasing member) 30 (130) for applying a biasing force in a direction to always shield at least part of the card insertion port 23 (123) by the shutter plate (portion) 26a (126a).

More specifically, the card receiving mechanism of the present invention is constituted by only the shutter member obtained by integrally forming the shutter lever and the shutter plate to open/close the card insertion port in accordance with the non-insertion/insertion state of the card, and the biasing member for applying a predetermined biasing force to the shutter member. This card receiving mechanism requires the minimum number of components. The entire card processing apparatus can be decreased in cost, as much as possible.

Furthermore, as has been described in detail in the first and second embodiments, this card receiving mechanism receives only a qualified card having a predetermined width and thickness. An unqualified card having no predetermined width or thickness and a foreign article can be certainly prevented from entering.

Figure 21:
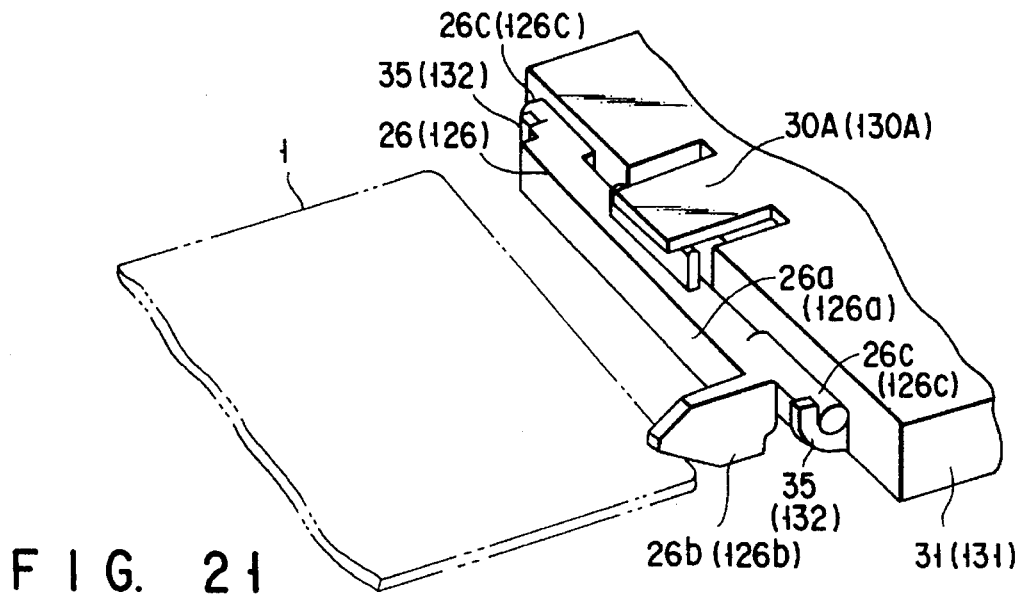
FIG. 21 is a perspective view showing a modification of a card receiving portion common to the first and second embodiments.

FIG. 21 shows a modification of the card receiving mechanism common to the first and second embodiments.

More specifically, this modification employs a leaf spring 30A (130A) integrally formed by the housing 28 (128), the frame 31 (131), or the cover 29 (129), in place of the leaf spring 30 (130). With this structure, the number of components is further decreased.

The third embodiment of the present invention will be described below with reference to the accompanying drawings.

Figure 22:
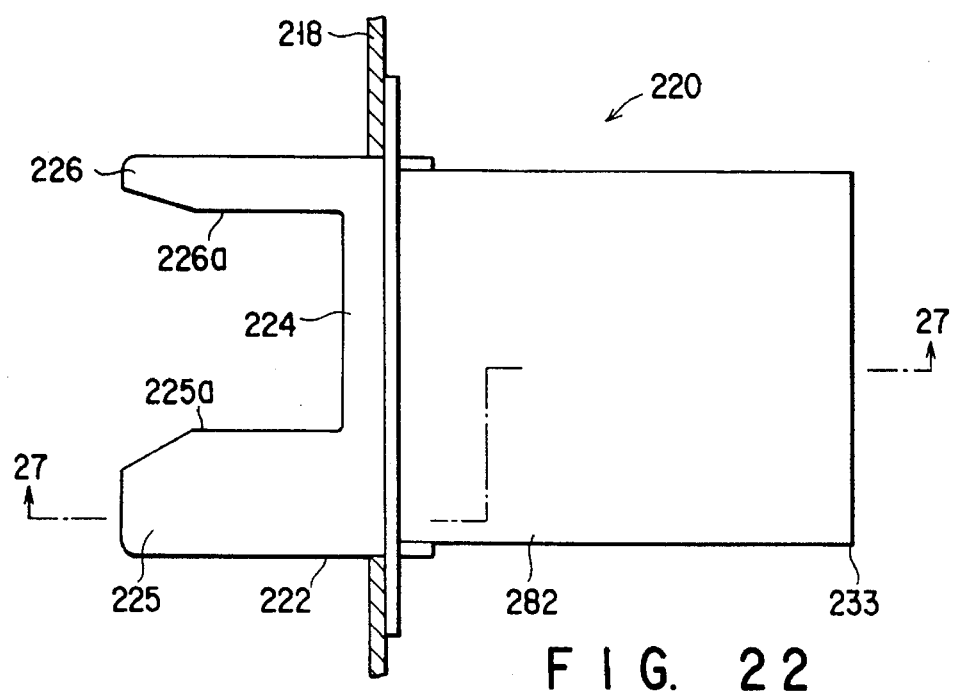
FIG. 22 is a plan view showing a card processing apparatus according to the third embodiment of the present invention.
Figure 23:
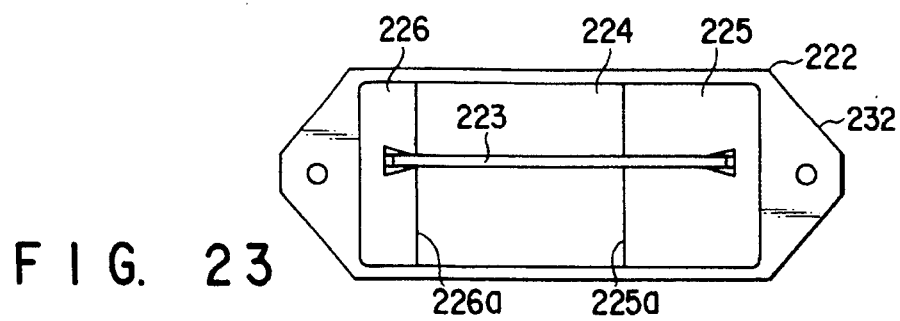
FIG. 23 is a front view showing the card processing apparatus of the third embodiment.
Figure 24:
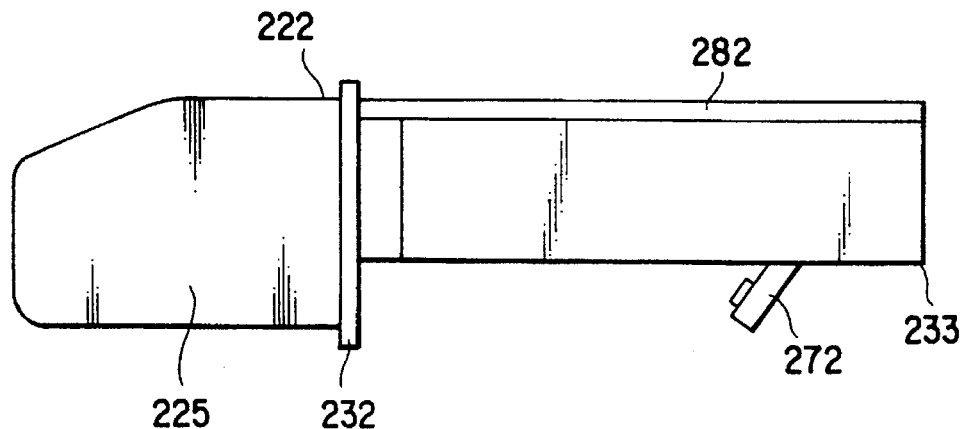
FIG. 24 is a side view showing the card processing apparatus of the third embodiment.
Figure 25:
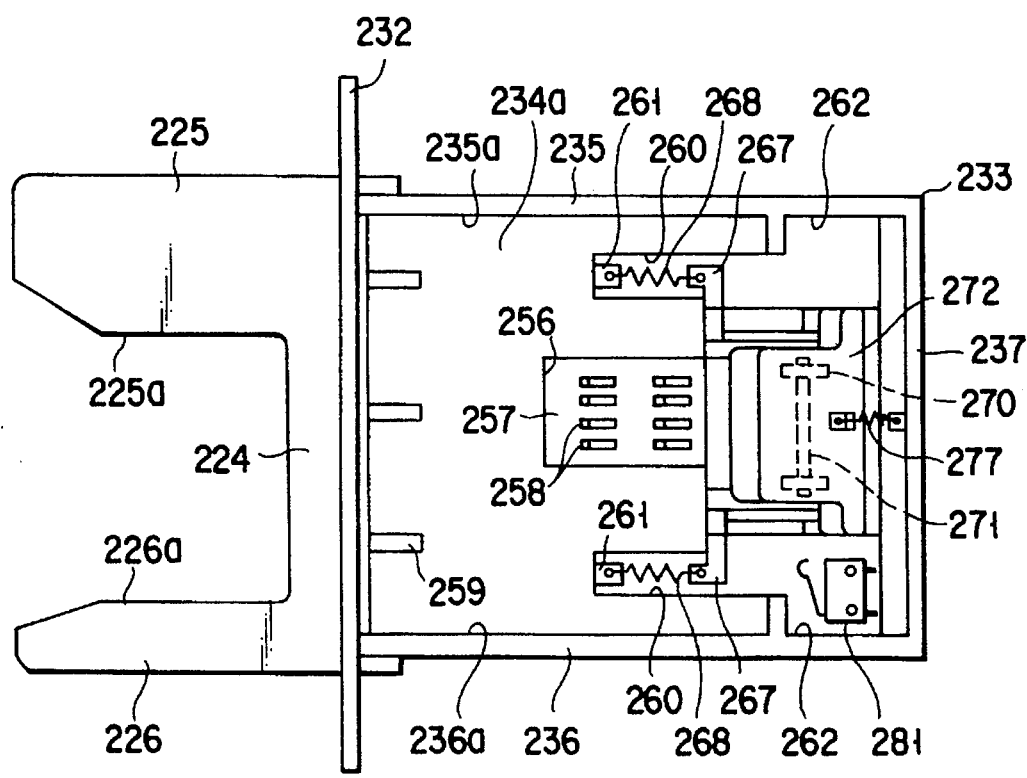
FIG. 25 is a bottom view showing the card processing apparatus of the third embodiment.

FIGS. 22 to 27 show the outer appearance and internal structure of a card processing apparatus 220 having a card receiving mechanism according to the third embodiment. This card processing apparatus 220, as shown in FIG. 22, is arranged in a housing 218 of a public telephone set. An IC card or credit card manually inserted by a user is received to a position where the card can be removed, and information (e.g., call rate information) recorded on the card is read/written from/in the card.

The card processing apparatus 220 is constituted by a card slot 222 fixed to project from the housing 218 to receive the card from the outside, a frame 233 fixed to the rear portion of the card slot 222, and a cover 282 closing the upper surface of the frame 233.

The card slot 222 has a hollow structure having an opening portion formed in the rear surface side. The card slot 222 is constituted by a base portion 224 having a slit-like card insertion port 223 formed on the front surface side thereof and opposing projecting portions 225 and 226 largely projecting forward from both the sides of the base portion 224. The card slot 222 is formed to have an almost channel-like shape when viewed from the upper direction. The interval between opposing side surfaces 225a and 226a of the two projecting portions 225 and 226 is set to be smaller than the proper width of a card. Guide grooves 227 and 228, communicating with the card insertion port 223, for horizontally guiding the card inserted from the user side while regulating movement of the card in the widthwise direction are formed in the side surfaces 225a and 226a, respectively.

A magnetic head 229 for reading the magnetic information from a credit card is arranged in the wider projecting portion 225 of the two projecting portions 225 and 226.

The magnetic head 229 is supported by a head support member 230 such that the magnetic recording portion of the credit card passing through the guide groove 227 is brought into slidable contact with the head surface of the magnetic head 229. The head support member 230 is an integral body formed of a synthetic resin. The magnetic head 229 is supported in a box-like head support portion 230a on one end side of the head support member 230. The end portion of a batten-like arm portion 230b extending backward from the head support portion 230a is fixed to the opening edge portion of the card slot 222 on the rear surface side. The magnetic head 229 is always biased in a direction to enter the guide groove 227 by the elastic force of the arm portion 230b.

Note that a card passage 231, communicating with the guide grooves 227 and 228 of the card slot 222, for horizontally guiding a card inserted from the card insertion port 223 to the frame 233 is formed deep in the card insertion port 223. A step portion 222a formed lower than the bottom surface of the card passage 231 by one step is arranged on the rear end of the card passage 231.

Flanges 232 are arranged on both the sides of the card slot 222. Since the flanges 232 are mounted on the inner surface side of the housing 218 with screws, the IC card processing apparatus 220 is entirely supported by the housing 218.

On the other hand, the frame 233 is constituted by a substantially rectangular base plate 234, opposing side plates 235 and 236 standing on both the sides of the base plate 234, and a rear plate 237 coupling the rear end of the side plate 235 to that of the side plate 236. The frame 233 is formed to have an almost rectangular shape when viewed from the upper direction, and a substantially H shape when viewed from the card slot 222.

Figure 28A:
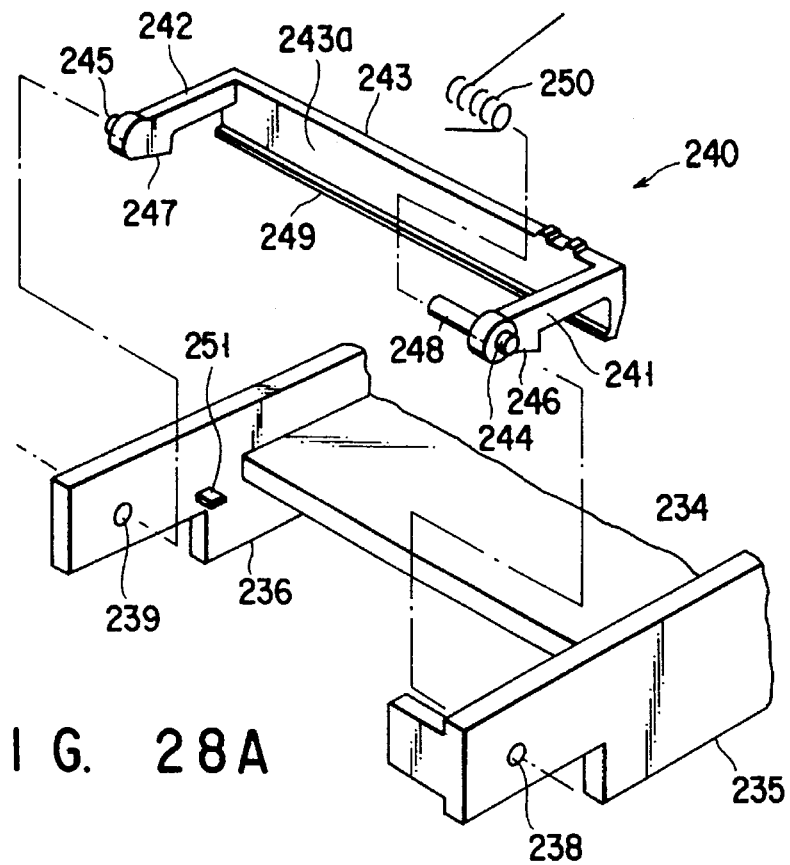
FIGS. 28A and 28B are exploded perspective views showing the main part of the card processing apparatus of the third embodiment and that of a modification, respectively.

The side plates 235 and 236 constitute a pair of guide portions of the card receiving mechanism in the third embodiment. Inner wall surfaces 235a and 236a (guide surfaces) of the side plates 235 and 236 oppose parallel to each other at an interval slightly larger than the proper width of a card to linearly receive the card inserted from the card insertion port 223 while regulating movement of the card in the widthwise direction. The front end sides of the side plates 235 and 236 extend to the projecting portions 225 and 226 of the card slot 222 and are contiguous to the side wall surfaces of the guide grooves 227 and 228 of the projecting portions 225 and 226, respectively. Shaft holes 238 and 239, as shown in FIG. 28A, are formed in the upper portions of the front ends of the side plates 235 and 236, respectively.

A shutter member 240 is supported by the shaft holes 238 and 239. The shutter member 240 is an integral body formed of a synthetic resin. The shutter member 240 is constituted by arm portions 241 and 242 extending deep along the inner walls of the corresponding side plates 235 and 236, and a substantially batten-like shutter plate 243 coupling the rear end of the arm portion 241 to that of the arm portion 242. The shutter member 240 is formed to have a channel-like shape when viewed from the upper direction.

Shafts 244 and 245 project outward from the outer surfaces of the arm portions 241 and 242 on the front end sides, respectively. Contact portions 246 and 247 each having a lower edge portion extending obliquely backward are arranged on the lower portions of the arm portions 241 and 242 near the shafts, respectively. A spring shaft 248 projects from the inner surface of one arm portion 241.

The shutter plate 243 is located behind the card insertion port 223 such that a front surface 243a faces the card insertion direction. A regulating portion 249, projecting forward, for regulating downward movement of the leading end of the card in contact with the front surface 243a is arranged on the lower end of the front surface 243a along the widthwise direction.

This shutter member 240 is pivoted about the shafts 244 and 245, which are fitted in the corresponding shaft holes 238 and 239 of the side plates 235 and 236 of the frame 233.

A spring 250 having one end locked with the distal end of the side plate 235 and the other end locked with the upper edge of the shutter plate 243 is attached to the spring shaft 248 of the shutter member 240. This shutter member 240 is always biased by this spring 250 to be pivoted in a direction to enter the contact portions 246 and 247 and the shutter plate 243 toward the card passage 231. Respective stoppers 251 for regulating the pivotal movement of the shutter member 240 by the spring 250 project from corresponding positions of the inner wall surfaces of the side plates 235 and 236 where the lower ends of the contact portions 246 and 247 are substantially brought into contact with the bottom surface of the card passage 231.

Figure 28B:
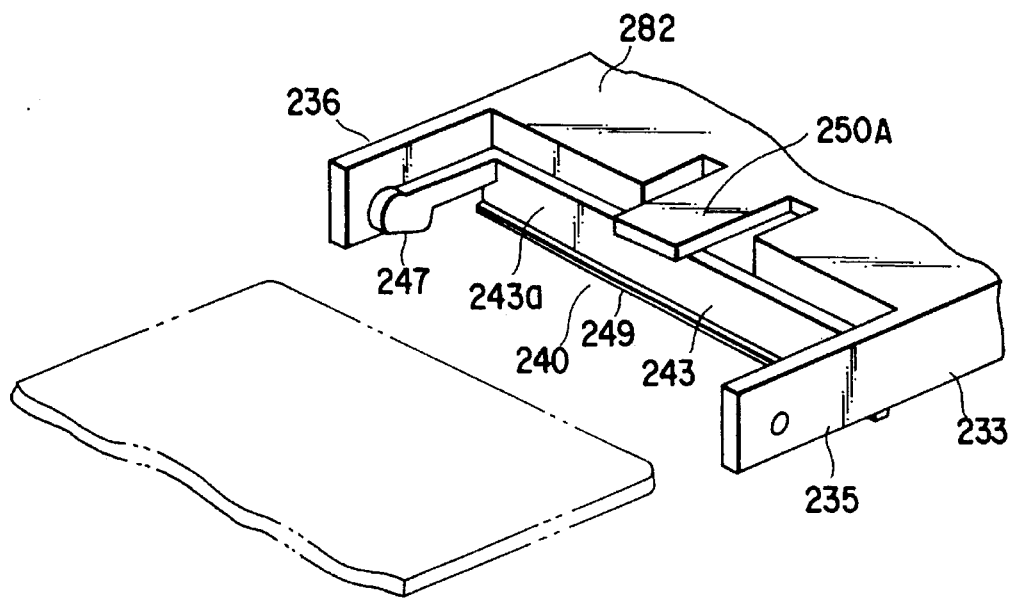

Note that a leaf spring 250A integrally formed by the frame 233 or the cover 282 may be used for the spring 250, as in a modification shown in FIG. 28B.

A card passes through the guide grooves 227 and 228 to enter the card insertion port 223 while its widthwise movement is regulated by the side walls of the guide grooves 227 and 228 of the card slot 222, and the inner walls of the side plates 235 and 236. When the card passes through the card insertion port 223 while the leading end of the card is in contact with the edges of the contact portions 246 and 247, the shutter member 240 is pivoted about the shafts 244 and 245 to move the rear ends of the arm portions 241 and 242 upward. The shutter plate 243 is retracted upward from the card passage 231.

Note that, in the shutter member 240, the distance from the shaft 244 or 245 to the contact portion 246 or 247, the distance from the shaft 244 or 245 to the shutter plate 243, a ratio of the former to the latter, the height of the shutter plate 243, and the like are set as follows. That is, when no card is inserted or a card having a thickness smaller than a predetermined thickness such as a telephone card passes through the lower ends of the contact portions 246 and 247, the upper end of the regulating portion 249 of the shutter plate 243 is located lower than the bottom surface of the card passage 231. When a card having a predetermined thickness such as a credit card or an IC card passes through the lower ends of the contact portions 246 and 247, the lower end of the shutter plate 243 (the lower end of the regulating portion 249) is moved upward to a position spaced apart from the bottom surface of the card passage 231 by the thickness (predetermined thickness) of the card or more.

On the other hand, a terminal plate mounting hole 256 is formed to extend through the almost central portion of the base plate 243. A terminal plate 257 is arranged in the terminal plate mounting hole 256. Contact terminals 258 to be brought into contact with the external terminals of an IC card, respectively, are arranged in a 2×4 matrix. Each of the contact terminals 258 consists of a conductive material (e.g., phosphor bronze or the like) having spring characteristics and is formed to be bent in a substantial V shape. One end of each contact terminal 258 is fixed on the terminal plate 257, and the other end is inserted in a corresponding one of terminal holes 257a formed in the terminal plate 257, so that the lower end portion of the contact terminal 258 is supported to project downward from a lower surface 234a of the base plate 234. When the contact terminals 258 are pressed from the lower direction, the contact terminals 258 are moved upward while the contact terminals 258 are elastically deformed, and the elastic restoring force of the contact terminals 258 opposes the pressing force from the lower direction.

An inclined guide portion 259 projects from the front portion of the lower surface 234a of the base plate 234 of the frame 233. The inclined guide portion 259 guides a card having a predetermined thickness and almost horizontally entering the card insertion port 223 such that the card is spaced apart from the lower surface of the base plate 234 so as not to deform the contact terminals 258 by the leading end of the card.

Grooves 260 are formed on both the sides of the terminal plate mounting hole 256, respectively, and hooks 261 are formed at the front ends of the spring grooves 260, respectively. The grooves 260 communicate with holes 262 vertically extending through both the corners of the rear portion of the frame.

On the rear portion of the terminal plate mounting hole 256, a slide table 263 formed higher than an upper surface 234b of the base plate 234 by one step extends to the rear portion of the frame with a predetermined width.

Figure 29:
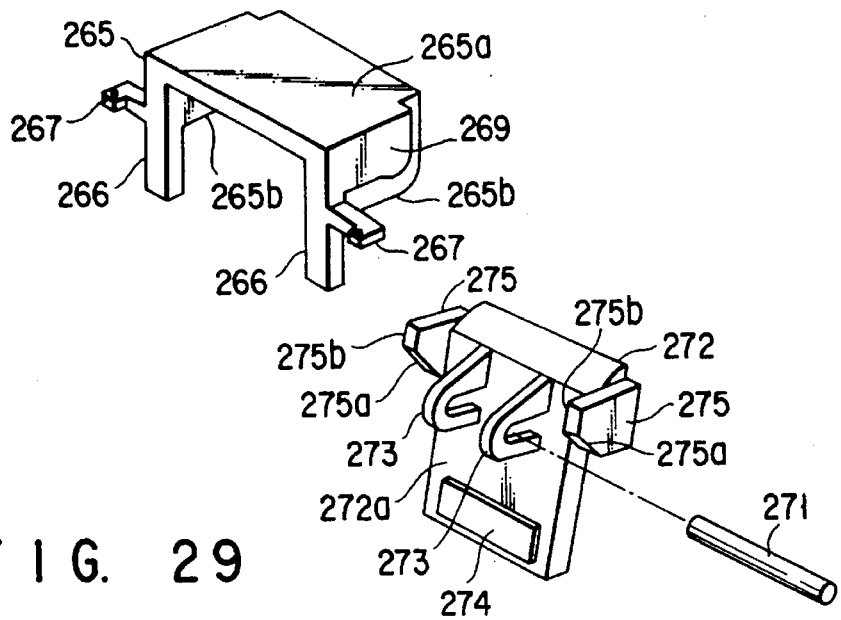
FIG. 29 is an exploded perspective view showing the main part of the card processing apparatus of the third embodiment.

A slide member 265 is mounted on the slide table 263. The slide member 265, as shown in FIG. 29, is constituted by an almost rectangular upper plate 265a, and side plates 265b respectively extending downward from both the sides of the upper plate 265a. The slide member 265 is formed to have an almost U shape. The lower surface of the upper plate 265a is brought into contact with the upper surface of the slide table 263, and the slide table 263 is sandwiched by both the side plates 265b, so that the slide member 265 is supported to be slid back and forth.

Card receivers 266 vertically passing through the holes 262 on both the sides of the slide table 263 and extending to the base plate 234 are suspended at both the ends of the front portion of the upper plate 265a. These card receivers 266 are brought into contact with the leading end of a card inserted into the card storage unit 238 to slide the slide member 265 backward.

Hooks 267 are arranged at the middle portions of the card receivers 266, respectively, and springs 268 for returning the slide member 265 to the card insertion port 233 when the card is removed suspend between the spring hooks 267 and the hooks 261 in the grooves 260 of the base plate 234.

Cam portions 269 each having an arc-like outer periphery and brought into contact with a card pressing member 272 (to be described later) to pivot the card pressing member 272 when the slide member 265 is slid backward are formed on both the side plates 265b of the slide member 265, respectively.

Two bearings 270 project from the lower surface of the slide table 263 along the widthwise direction of the slide table 263. A shaft 271 extends through the bearings 270, and the card pressing member 272 is pivotally supported by the shaft 271.

The card pressing member 272, as shown in FIG. 29, is formed like a T-shaped plate. Two bearings 273 project from the upper portion of one surface 272a of the card pressing member 272, and a cushioning member 274 consisting of rubber, sponge, or the like is fixed to the lower portion of the surface 272a. The card pressing member 272 is pivotally supported on the lower surface of the slide table 263 by the shaft 271 communicating with the two bearings 273 such that the surface 272a faces the terminal plate 257.

On both the sides of the upper portion of the card pressing member 272 opposing contact pieces 275 project toward one surface 272a. The outer periphery of each of the contact pieces 275 is formed such that an inclined portion 275a inclined with respect to the surface 272a is continuous with each of parallel portions 275b parallel to the surface 272a. When the inclined portion 275a is in contact with the outer periphery of each cam portion 269 of the slide member 265, and the slide member 265 is slid backward, the card pressing member 272 is pivoted to being the lower portion of the card pressing member 272 close to the lower surface of the base plate 234. When the slide member 275 is pressed to a position where its rear end is brought into contact with the rear plate 237 of the frame 233, the parallel portion 275b is brought into contact with the cam portion 269, and the card pressing member 272 becomes almost horizontal.

Note that the spring 277 is looped between the rear surface side of the card pressing member 272 and the inner wall of the rear plate 237 of the frame 233.

A microswitch 281 is supported by a circuit board (not shown) in one hole 262 at the rear corner of the base plate 234. The microswitch 281 is a sensor for detecting that a card is inserted deep. The microswitch 281 is arranged at a position where the microswitch 281 is pressed by the rear portion of one of the spring hooks 267 to be turned on when the slide member 265 is pressed to the rearmost position.

The upper surface of the frame 233 is covered with the cover 282. The cover 282 regulates upward movement of the slide member 265 with its lower surface.

Note that the magnetic head 229, the contact terminals 258, and the microswitch 281 are connected to the control unit (not shown) of, e.g., a public telephone set through the circuit board. This control unit controls normal speech communication and also determines insertion/removal of a card on the basis of the ON/OFF state of the microswitch 281 to read/write information from/in an inserted card through the contact terminals 258.

The operation of the card processing apparatus 220 will be described below.

A card (IC card or credit card) is guided by the guide grooves 227 and 228 of the two projecting portions 225 and 226 of the card slot 222 to be inserted from the card insertion port 223. When the card C passes through the card insertion port 223 with its leading end being brought into slidably contact with the edges of the contact portions 246 and 247 of the shutter member 240, the shutter member 240 is pivoted about the shafts 244 and 245 to move the shutter plate 243 upward.

Figure 30A:
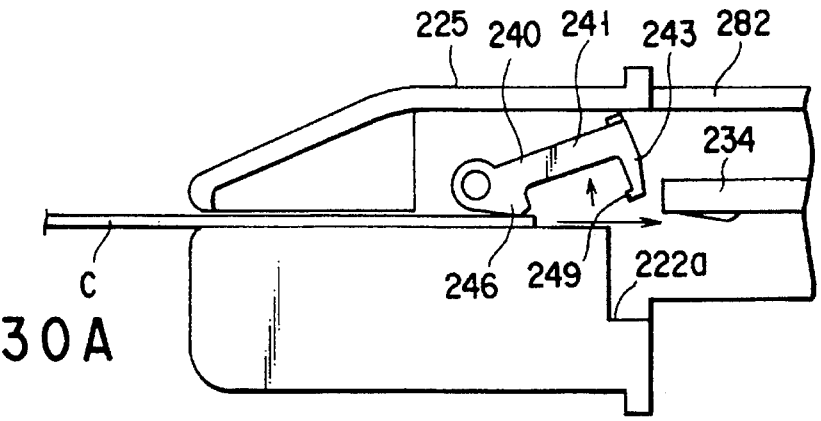
FIGS. 30A to 30D are schematic side views for explaining the operation of the main part of the card processing apparatus of the third embodiment.

As shown in FIG. 30A, when the leading end of the card C completely passes through the lower ends of the contact portions 246 and 247, the shutter member 240 is pivoted through an angle corresponding to the thickness of the card C. The lower end of the shutter plate 243 is retracted upward from the bottom surface of the card passage 231 by the thickness of the card C. The card C, therefore, can pass under the shutter plate 243 to enter the lower surface side of the base plate 234 of the frame 233.

Figure 30B:
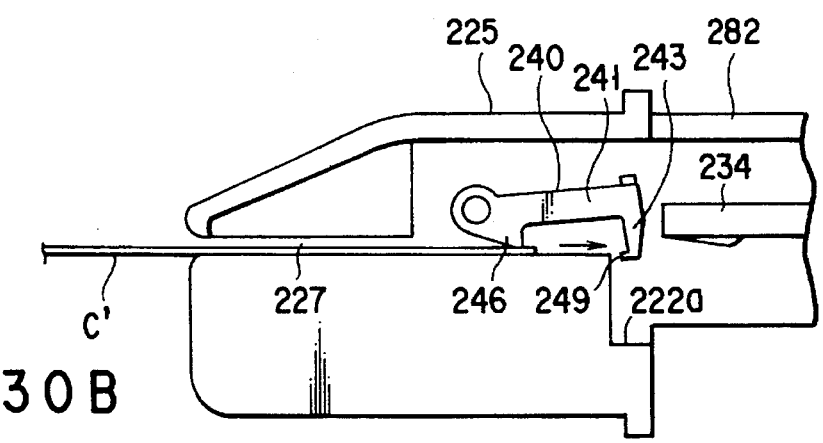
Figure 30C:
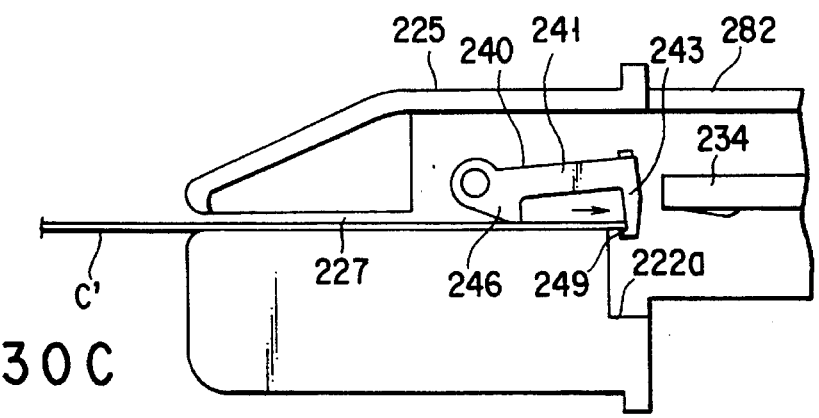

For example, assume that a card C' having a thickness smaller than the predetermined thickness such as a telephone card (or card-like foreign article) is inserted, as shown in FIG. 30B. Even if the leading end of the card C' passes through the lower ends of the contact portions 246 and 247, the upper end of the regulation portion 249 of the shutter plate 243 does not reach a position higher than the bottom surface of the card passage 231. For this reason, as shown in FIG. 30C, the leading end of the card C' is brought into contact with the front surface 243a of the shutter plate 243 and cannot enter deep.

A telephone card and a card-like foreign article having a thickness smaller than a predetermined thickness, therefore, cannot be inserted inside this IC card processing apparatus 220.

Figure 30D:
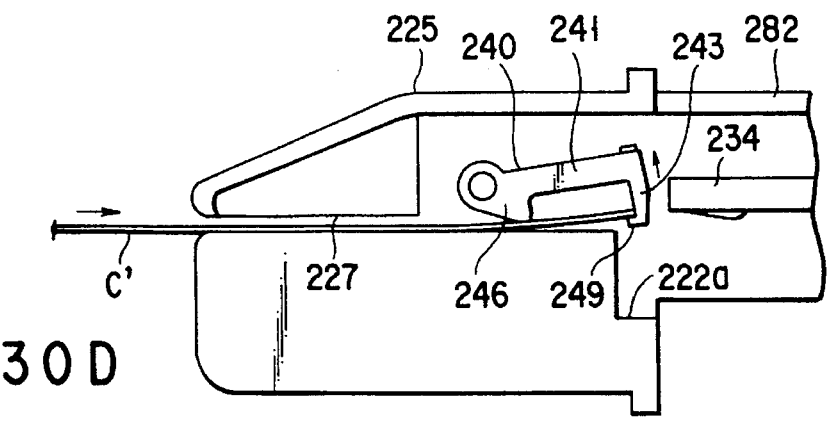
Figure 35A:
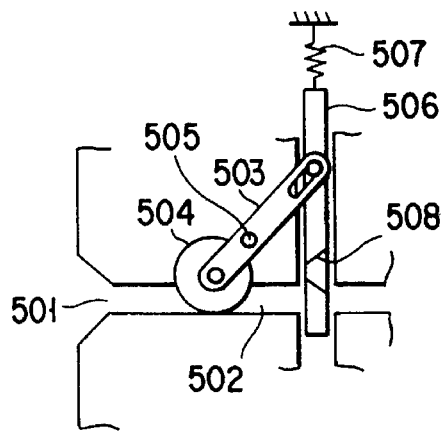
FIGS. 35A to 35D are schematic side views for explaining the arrangement and operation of a conventional card receiving mechanism.
Figure 35B:
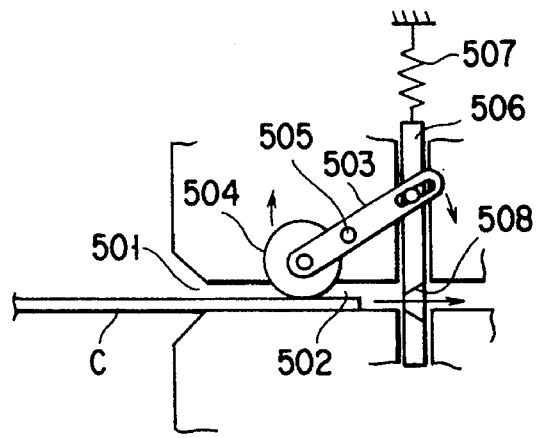
Figure 35C:
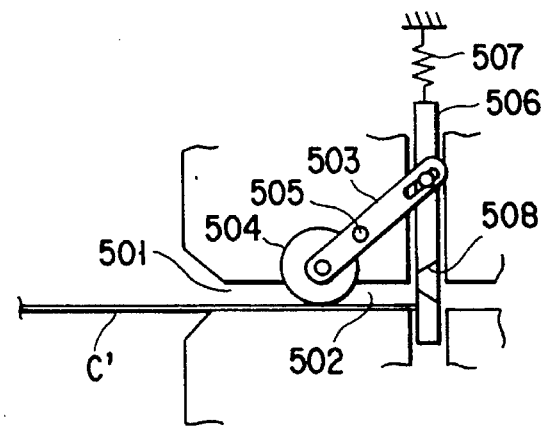
Figure 35D:
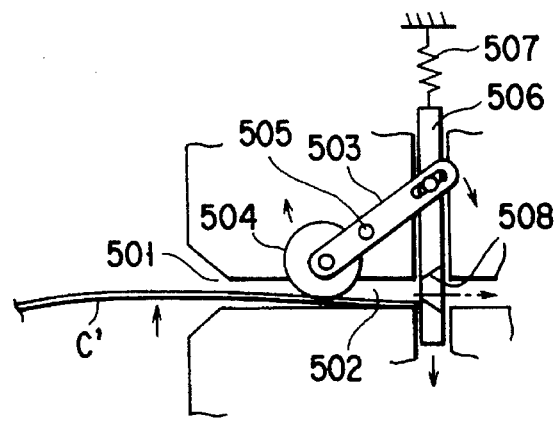

Note that, as shown in FIG. 30D, if the thin card C' is to be forcibly inserted, the force acts on the shutter member 240 to move the shutter plate 243 upward. With the movement of the shutter plate 243, the contact portions 246 and 247 are also moved upward. The entire card C' is bent downward, and its leading end tends to return downward. The leading end of the card C', however, is prevented from moving downward by the regulation portion 249 of the shutter plate 243.

The leading end of the card C', therefore, is prevented from entering deep or under the step portion 222a. In addition, it can be prevented that the card cannot be removed due to the forcible insertion.

The card C having the predetermined thickness and passing through the shutter member 240 passes below the contact terminals 258 while the card C is slightly pressed downward by the inclined guide portion 259 arranged on the lower surface of the base plate 234. The leading end of the card C is brought into contact with the card receivers 266 of the slide member 265.

Figure 31A:
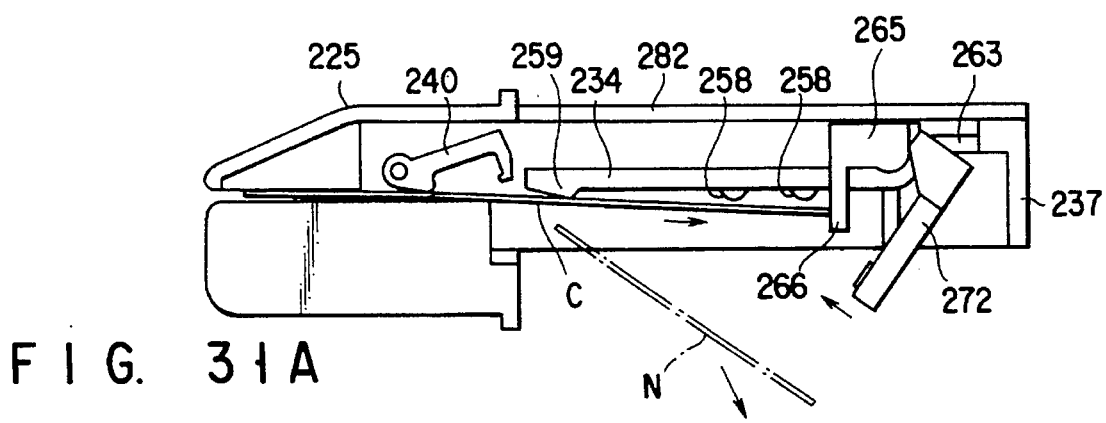
FIGS. 31A and 31B are schematic side views for explaining the operation of the main part of the card processing apparatus of the third embodiment.
Figure 31B:
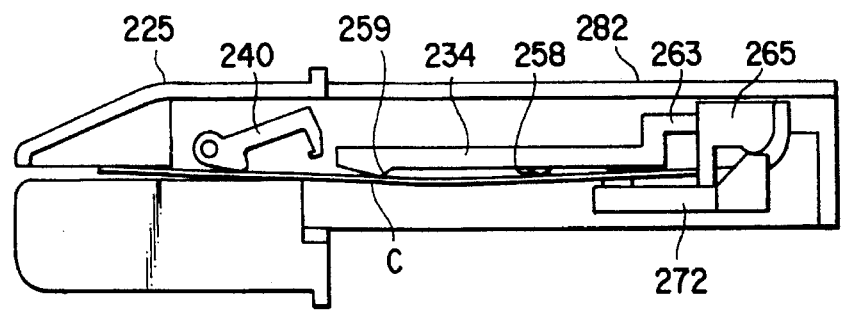

When the card is inserted deeper, the card presses the slide member 265 to slide the slide member 265 backward. The card pressing member 272 having the inclined portions 275a of the contact pieces 275 circumscribed to the cam portions 269 of the slide member 265 is pivoted to bring one surface of the card pressing member 272 close to the terminal plate 257. As shown in FIG. 31B, when the slide member 265 is slid to a position where the slide member 265 is brought into contact with the rear portion 237 of the frame 233, the card pressing member 272 is pivoted to be kept almost horizontal, and the card C is pressed upward from the lower surface through the cushioning member 274. If this card C is an IC card, the external terminals of the card C into contact with the contact terminals 258, respectively.

At this time, the middle portion of the trailing end of the card C is exposed between the two projecting portions 225 and 226 of the card slot 222. The middle portion of the card C is slightly pressed downward by the inclined portion 259, and the leading end is pressed upward by the card pressing member 272. For this reason, a force for bending the card acts on the contact portion between the card and the inclined portion 259. However, this force is weak, and no integrated circuit is incorporated in the contact portion of the card even if the card C is an IC card. Therefore, the card is not disabled.

In addition, the returning force of the spring 268 is preset to be weaker than a friction force generated between the base plate 234 and the card by slightly bending the card, and the cam portions 269 of slide member 265 are kept in contact with the parallel portions 275b of the contact pieces 275 of the card pressing member 272 and receive only the upward moments of the card pressing member 272. For this reason, if the card is left in this state, the card will not return.

In this state, the microswitch 281 is pressed by the card receivers 266 of the slide member 265 to turn on the microswitch 281.

If this card C is an IC card, when it is detected that the microswitch 281 is turned on, information is read/written from/in the memory in the card through the contact terminals 258. Upon completion of speech communication or the like, when the card is removed, the slide member 265 is returned by the action of the springs 268, and the microswitch 281 is turned off. The card pressing member 272 is pivoted by the action of the spring 277 to be returned. When the card is completely removed from the card insertion port 223, the shutter plate 243 and the contact portions 246 and 247 of the shutter member 240 are moved downward to the card passage 231, and the card pressing member 272 is returned to the original state (state shown in FIG. 27).

When this card C is a credit card, the card is inserted deep once and removed soon. The magnetic information of the credit card is read by the magnetic head 299 in the projecting portion 225 of the card slot 222. After the information is collated in a center station, speech communication is enabled.

When a card-like foreign article N having a thickness almost equal to a predetermined thickness and a length smaller than a proper length is inserted, this card-like foreign article N enters deep without being regulated by the shutter member 240. As shown in FIG. 31A, however, if the trailing end of the card-like foreign article N passes through the card insertion port 223 before the leading end of the card-like foreign article N reaches the card receivers 266 of the slide member 265, the card-like foreign article N is discharged from the largely open lower surface of the frame 233.

When a card-like foreign article which cannot completely press the slide member 265 to the rearmost position is inserted, this card-like foreign article is pressed to the card insertion port 223 by the springs 268 when a hand is removed from the card-like foreign article.

When a foreign article having a width smaller than a proper width such as a coin is directly inserted from the card insertion port 233 without passing through both the guide grooves 227 and 228 of the card slot 222, the foreign article does not pass below any one of the contact portions 246 and 247 of the shutter member 240, so the shutter 243 is not moved upward. Therefore, the foreign article is prevented from entering by the shutter plate 243.

As has been described above, in this card processing apparatus 220, if a card having a thickness smaller than a predetermined thickness or a card-like foreign article is inserted, or a narrow foreign article is inserted without passing through the guide grooves, the shutter will not open, thereby preventing the card or foreign article from entering. In addition, if a card-like foreign article having a thickness almost equal to a predetermined thickness and a length smaller than a proper length is inserted, the foreign article is discharged or easily removed. Therefore, a card insertion error can be prevented, and forcible insertion of a thin card and an intentional card jam can also be prevented.

The arm portions of the shutter member can be arranged at the projecting portions for holding the magnetic head. In this manner, the interiors of the projecting portions can be effectively used.

The IC card reading contact terminals are provided to the frame together with the magnetic head. With this arrangement, this card processing apparatus 220 can be commonly used for processing a magnetic card having a predetermined thickness such as a credit card, and an IC card having the predetermined thickness.

The magnetic head is supported and pressed against a card only by the support member having an elastic force. Therefore, a press roller, a member for supporting this, and the like can be eliminated unlike a conventional apparatus, so the number of components is decreased to simplify the structure.

In the card receiving mechanism of the third embodiment, the shutter member is arranged above the card passage. The contact portions are moved upward as a card enters. The shutter portion is retracted upward to open the card passage. Alternatively, the shutter member may be arranged below the card passage. The contact portions may be moved downward as a card enters. The shutter portion may be retracted downward to open the card passage.

In the third embodiment, a foreign article having a width smaller than that of a proper card is prevented from entering by arranging the contact portions near the pair of guide portions. Alternatively, only one contact portion may be arranged near one guide portion side.

The contact portions of two independent shutter members may be arranged near corresponding guide portions. With this arrangement, if a foreign article having a width smaller than a proper width is inserted along one guide portion side, the other shutter member can prevent this foreign article from entering. A foreign article can be more certainly prevented from entering.

In the third embodiment, when no card is inserted, the lower ends of the contact portions of the shutter member are in almost contact with the bottom surface of the card passage. Alternatively, a gap corresponding to, e.g., the thickness of a thin card may be formed between the lower end portions (or upper end portions if the shutter member is arranged below the card passage) of the contact portions and the bottom surface (or upper surface) of the card passage. With this arrangement, the thin card passes through the gap without being brought into contact with the contact portions. Only when a card having a predetermined thickness enters, the shutter portion is largely moved to allow the card to enter deep.

In the third embodiment, the shutter member is supported on the frame side. Alternatively, it may be supported by the inner wall of the card slot.

In the card processing apparatus of the third embodiment, almost the entire lower surface of the frame is opened. When a card having a predetermined thickness enters, the card pressing member is pivoted from the lower direction to support the lower surface of the card. This does not limit the present invention. The present invention can be similarly applied to a card processing apparatus in which a frame has a bottom plate, and a card is guided between a base plate and the bottom plate.

In the card processing apparatus of the third embodiment, a card inserted from the card insertion port is guided deep such that it is slightly pressed downward. This does not limit the present invention. For example, in place of the inclined guide portion of the base plate, a mechanism (cam mechanism, link mechanism, or the like) interlocked with the sliding operation of the slide member to move downward the terminal contacts or the terminal plate supporting the terminal contacts is provided. The lower surface of an inserted card is pressed upward by the card pressing member to move the contact terminals downward, thereby bringing the contact terminals into contact with external terminals. In this manner, any bending force need not act on the inserted card.

In the card processing apparatus of the third embodiment, although the card slot having the card insertion port and the frame are formed as different units, they may be formed integrally. In addition, the card slot may have only one projecting portion.

In the card processing apparatus of the third embodiment, the present invention is applied to the card processing apparatus in which a card is manually inserted and removed. The present invention can also be applied to a card processing apparatus in which card is received and discharged by a card convey mechanism.

As has been described above, the card receiving mechanism according to the third embodiment of the present invention comprises the shutter member constituted by the arm portions extending along the guide surfaces of the guide portions and supported to be pivotable about the front end portions on the port side of the card passage, the shutter portion extending from the rear end portions of the arm portions with one surface facing the port side of the card passage, the regulation portions arranged on one surface of the shutter portion, for regulating the widthwise movement of the leading end of a card brought into contact with this surface, and the contact portions, extending from the middle portions of the arm portions to the card passage side, for pivoting the arm portions through an angle corresponding to the thickness of the card entering the card passage. With this arrangement, the card receiving mechanism allows or prevents passage of a card in accordance with the thickness of the card.

For this reason, such a card receiving mechanism can certainly prevent a card having a thickness smaller than a predetermined thickness from entering with a smaller number of components. A card jam can be avoided if a thin card is forcibly inserted or a foreign article is inserted.

In the card processing apparatus of the third embodiment of the present invention, the arm portions of the shutter member are arranged in the projecting portions projecting forward from the front surface side of the card slot, and the shutter portion extending from the rear end portions of the arm portions is arranged behind the card insertion port of the card slot. Therefore, even if the length of each arm portion is increased, the distance from the card insertion port to the shutter member can be decreased to prevent an insertion error of a thin card and trouble caused by a jam of a short foreign article other than a card.

When the magnetic head and the arm portions of the shutter member are arranged on the projecting portions, the internal spaces of the projecting portions can be effectively used to realize downsizing.

When the IC card reading contact terminals are arranged on the frame together with the magnetic head, one card processing apparatus can be commonly used for processing a magnetic card having a predetermined thickness such as a credit card and an IC card having the predetermined thickness.

The card processing apparatus in which the magnetic head is supported and pressed against a card by only the support member having an elastic force requires a smaller number of components to simplify the structure.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A card receiving mechanism comprising:

a card slot member having a card insertion port, and a pair of guide grooves, arranged opposite to each other, for guiding a card inserted from the card insertion port while regulating movement of said card in a widthwise direction perpendicular to a card insertion direction;

a shutter member having a lever portion arranged near at least one of said pair of guide grooves around the card insertion port and brought into contact with said card inserted and guided to be moved in a direction of card thickness, and a shutter portion which is integrally formed by said lever portion, located behind a contact point with said lever portion so as to shield at least part of the card insertion port, and actuated to open a shielded portion of said card insertion port with movement of said lever portion in the direction of card thickness upon insertion of said card; and a biasing member for applying a biasing force in a direction to always shield at least part of said card insertion port by said shutter portion of said shutter member.

2. A mechanism according to claim 1, wherein said shutter plate portion has a long side extending in a horizontal direction to close the card insertion port, and said shutter lever portion has an inclined lower portion projecting from one end side of said shutter plate portion to said pair of guide grooves.

3. A mechanism according to claim 2, wherein said shutter member further comprises a pair of shafts projecting sideward from corresponding both ends of said shutter plate portion, and said shutter member is pivoted about said pair of shafts as fulcrums to open/close the card insertion port.

4. A mechanism according to claim 3, wherein said shutter member further comprises a projection projecting upward from an upper end of a center of said shutter plate, and said biasing member comprises a leaf spring, engaged with said projection, for applying a biasing force downward.

5. A mechanism according to claim 4, wherein said leaf spring is integrally formed by a housing arranged behind said card slot member.

6. A card receiving mechanism comprising:

a pair of opposing guide portions, extending in a card insertion direction, for receiving an inserted card from a card passage while regulating widthwise movement of said card; and a shutter member, arranged near at least one of said pair of guide portions, for allowing or preventing passage of said card guided by said pair of guide portions to enter in accordance with a thickness of said card, said shutter member being integrally formed by an arm portion extending along a guide surface of at least one of said guide portions and supported to be pivotable about a front end portion on a port side of said card passage, a shutter portion extending from a rear end portion of said arm portion with one surface facing the port side of said card passage so as to shield said card passage, a regulation portion, arranged on said one surface of said shutter portion, for regulating movement of a leading end of said card in contact with said one surface in a direction of card thickness, and a contact portion extending from a middle portion of said arm portion toward said card passage, brought into contact with said leading end of said card entering said card passage to pivot said arm portion through an angle corresponding to the thickness of said card, and biased to enter said card passage, wherein, when a card having a thickness smaller than a predetermined thickness is guided by said pair of guide portions to pass through said contact portion, said one surface of said shutter member is brought into contact with said leading end of said card to prevent said card having the smaller thickness from entering, and, when a card having the predetermined thickness is guided by said pair of guide portions to pass through said contact portion, said shutter member is retracted from said card passage in accordance with the thickness of said card.

7. A card processing apparatus comprising:

a card slot having a base portion which has a slit-like card insertion port on a front surface side, a projecting portion projecting forward from the front end side of said base portion, and a guide groove, arranged on a side surface of said projecting portion so as to communicate with the card insertion port, for guiding a card to said card insertion port while regulating widthwise movement of said card;

a shutter member for allowing or preventing passage of said card inserted from said card insertion port in accordance with a thickness of said card;

a frame for receiving said card which passes through said shutter member to enter up to a predetermined position with a trailing end of said card being exposed from a front surface of said card slot while regulating the widthwise movement of said card; and reading/writing means for reading/writing information from/in said card received to the predetermined position of said frame, said shutter member being integrally formed by an arm portion extending along a side wall surface of said guide groove in said projecting portion of said card slot and supported to be pivotable about a front end portion along said side wall surface, a shutter portion extending from a rear end portion of said arm portion with one surface facing said card insertion port so as to shield a card passage behind the card insertion port, a regulation portion, arranged on said one surface of said shutter portion, for regulating movement of a leading end of said card in contact with said one surface in a direction of thickness, and a contact portion extending from a middle portion of said arm portion toward said guide groove, brought into contact with said leading end of said card passing through said guide groove to pivot said arm portion through an angle corresponding to the thickness of said card, and biased to enter said guide groove, wherein, when a card having a thickness smaller than a predetermined thickness passes through said guide groove, said one surface of said shutter member is brought into contact with said leading end of said card to prevent said card having the smaller thickness from entering said frame, and, when a card having the predetermined thickness passes through said guide groove, said shutter member is retracted from said card passage in accordance with the thickness of said card to allow said card to enter said frame.

8. An apparatus according to claim 7, wherein said reading/writing means comprises a magnetic head, arranged on said projecting portion of said card slot and having a head surface projecting in said guide groove, for reading magnetic information from said card having the predetermined thickness and passing through said guide groove.

9. An apparatus according to claim 7, wherein said reading/writing means comprises a contact terminal brought into contact with an external terminal of an IC card having a predetermined thickness and inserted up to the predetermined position of said frame to read/write information from/in said card.

10. An apparatus according to claim 8, further comprising a head support member, having one end side supporting said magnetic head and the other end side fixed to said card slot, for biasing said magnetic head by an elastic force of a middle portion in a direction to allow a head surface of said magnetic head to enter said guide groove.

\* \* \* \* \*